US012778719B2

(12) United States Patent
Damon et al.

(10) Patent No.: US 12,778,719 B2
(45) Date of Patent: Nov. 3, 2026

(54) PASSIVE SELF-LIGATION BRACKET ASSEMBLY

(71) Applicant: Premier Orthodontic Designs, LLLP, Carson City, NV (US)

(72) Inventors: Paul L. Damon, Spokane, WA (US); Dwight H. Damon, Spokane, WA (US)

(73) Assignee: Premier Orthodontic Designs, LLLP, Carson City, NV (US)

(*) Notice: Subject to any disclaimer, the term of this patent is extended or adjusted under 35 U.S.C. 154(b) by 126 days.

(21) Appl. No.: 17/108,322

(22) Filed: Dec. 1, 2020

(65) Prior Publication Data

US 2021/0330429 A1 Oct. 28, 2021

Related U.S. Application Data

(60) Provisional application No. 63/015,528, filed on Apr. 25, 2020.

(51) Int. Cl.
*A61C 7/28* (2006.01)
*A61C 7/14* (2006.01)

(52) U.S. Cl.
CPC .............. *A61C 7/287* (2013.01); *A61C 7/145* (2013.01)

(58) Field of Classification Search
CPC .. A61C 7/125; A61C 7/28; A61C 7/27; A61C 7/145; A61C 7/285; A61C 7/287; A61C 7/12–18
See application file for complete search history.

(56) References Cited

U.S. PATENT DOCUMENTS 2,379,011 A 6/1945 Laskin
2,908,974 A 10/1959 Stifter
3,721,005 A 3/1973 Cohen
4,209,906 A 7/1980 Fujita
(Continued)

FOREIGN PATENT DOCUMENTS

AU 5016399 A 3/2000
CN 101330766 A 12/2008
(Continued)

OTHER PUBLICATIONS

MathIsFun, 2021 (Year: 2021).*
(Continued)

*Primary Examiner* — Nicholas D Lucchesi
(74) *Attorney, Agent, or Firm* — Firm Foundation IP LLC

(57) ABSTRACT

A passive self-ligation bracket system for correcting malocclusions and tooth alignment, provides a first passive self-ligation bracket and a second passive self-ligation bracket, each of the first passive self-ligation bracket and the second passive self-ligation bracket having, a bracket body with a facial end portion, an opposing lingual end portion carrying a bracket base pad configured for adherence to a tooth, and a mid-body portion, a movable door engaged with the bracket body at the facial end portion, and means for exerting a predetermined torque on a tooth from the lingual end portion and from the mid-body portion, and the means for exerting the predetermined torque is defined in the mid-body portion, and has a center; and an archwire simultaneously slidably engaged within the means of the first and second passive self-ligation brackets exerts the predetermined torque.

7 Claims, 19 Drawing Sheets

(56) References Cited

U.S. PATENT DOCUMENTS

| | | | | |
|---|---|---|---|---|
| 4,243,387 | A | 1/1981 | Prins | |
| 4,249,897 | A | 2/1981 | Anderson | |
| 4,353,692 | A | 10/1982 | Karrakussoglu | |
| 4,427,381 | A | 1/1984 | Hall | |
| 4,487,581 | A | 12/1984 | Adler | |
| 4,496,317 | A | 1/1985 | Hulsey | |
| 4,597,739 | A | 7/1986 | Rosenberg | |
| 4,676,746 | A | 6/1987 | Klapper | |
| 4,850,865 | A | 7/1989 | Napolitano | |
| 5,030,089 | A | 7/1991 | Kawaguchi | |
| 5,161,969 | A | 11/1992 | Pospisil et al. | |
| 5,275,557 | A | 1/1994 | Damon | |
| 5,302,121 | A * | 4/1994 | Gagin | A61C 7/12 433/10 |
| 5,322,435 | A | 6/1994 | Pletcher | |
| 5,358,402 | A | 10/1994 | Reed et al. | |
| 5,380,196 | A | 1/1995 | Kelly et al. | |
| 5,464,347 | A | 11/1995 | Allesee | |
| 5,474,447 | A | 12/1995 | Chikami et al. | |
| 5,618,175 | A | 4/1997 | Reher et al. | |
| 5,813,853 | A | 9/1998 | Kesling | |
| 5,820,370 | A | 10/1998 | Allesee et al. | |
| 5,908,293 | A | 6/1999 | Voudouris | |
| 5,954,502 | A | 9/1999 | Tuenge et al. | |
| 6,071,118 | A | 6/2000 | Damon | |
| 6,168,428 | B1 | 1/2001 | Voudouris | |
| 6,264,469 | B1 | 7/2001 | Moschik | |
| 6,305,932 | B1 | 10/2001 | Mottate | |
| 6,655,958 | B2 | 12/2003 | Abels et al. | |
| 7,192,274 | B2 | 3/2007 | Stadtmiller et al. | |
| 7,306,458 | B1 | 12/2007 | Lu | |
| 7,431,586 | B1 | 10/2008 | Silverman | |
| 7,686,613 | B2 | 3/2010 | Pospisil et al. | |
| 7,878,802 | B2 | 2/2011 | Hagelganz et al. | |
| 7,963,767 | B2 | 6/2011 | Lewis et al. | |
| 8,366,440 | B2 | 2/2013 | Bathen et al. | |
| 8,550,814 | B1 | 10/2013 | Collins | |
| 8,714,972 | B2 | 5/2014 | Eichenberg | |
| 9,198,740 | B2 * | 12/2015 | Damon | A61C 7/287 |
| 9,241,775 | B2 | 1/2016 | Romano et al. | |
| 9,504,539 | B2 | 11/2016 | Yick | |
| 9,532,853 | B2 | 1/2017 | Huang | |
| 9,636,191 | B2 | 5/2017 | Damon et al. | |
| 10,945,815 | B2 | 3/2021 | Damon et al. | |
| 11,065,087 | B2 | 7/2021 | Damon et al. | |
| 11,116,607 | B2 * | 9/2021 | Damon | A61C 7/12 |
| 11,179,226 | B2 | 11/2021 | Damon et al. | |
| 2002/0110771 | A1 | 8/2002 | Abels et al. | |
| 2004/0214128 | A1 | 10/2004 | Sachdeva et al. | |
| 2005/0239012 | A1 | 10/2005 | Bathen et al. | |
| 2006/0051721 | A1 | 3/2006 | Carriere Lluch | |
| 2006/0154196 | A1 | 7/2006 | Oda | |
| 2007/0172788 | A1 | 7/2007 | Hill, II et al. | |
| 2008/0113311 | A1 | 5/2008 | Forster | |
| 2008/0293005 | A1 | 11/2008 | Rahlis | |
| 2009/0004619 | A1 * | 1/2009 | Oda | A61C 7/146 433/10 |
| 2009/0042160 | A1 | 2/2009 | Ofir | |
| 2009/0136889 | A1 * | 5/2009 | Abels | A61C 7/14 433/10 |
| 2010/0178629 | A1 | 7/2010 | Oda et al. | |
| 2010/0285420 | A1 | 11/2010 | Oda | |
| 2010/0304321 | A1 | 12/2010 | Patel | |
| 2011/0039224 | A1 | 2/2011 | Cosse | |
| 2011/0183280 | A1 | 7/2011 | Cosse et al. | |
| 2011/0270583 | A1 | 11/2011 | Getto et al. | |
| 2011/0311934 | A1 | 12/2011 | Kantomaa | |
| 2012/0064475 | A1 | 3/2012 | Lewis et al. | |
| 2012/0107760 | A1 | 5/2012 | Fichenberg | |
| 2012/0122050 | A1 | 5/2012 | Bathen et al. | |
| 2012/0276496 | A1 | 11/2012 | Bathen et al. | |
| 2012/0308952 | A1 | 12/2012 | Cosse | |
| 2012/0315593 | A1 | 12/2012 | Ramos-de-la-Pena et al. | |
| 2014/0065567 | A1 | 3/2014 | Rahimi | |
| 2014/0205962 | A1 | 7/2014 | Damon et al. | |
| 2014/0272751 | A1 | 9/2014 | Cosse et al. | |
| 2015/0050612 | A1 | 2/2015 | Damon et al. | |
| 2015/0157422 | A1 | 6/2015 | Cosse et al. | |
| 2015/0182306 | A1 | 7/2015 | Chen et al. | |
| 2015/0230887 | A1 | 8/2015 | Damon et al. | |
| 2015/0238281 | A1 | 8/2015 | Alauddin et al. | |
| 2015/0305833 | A1 | 10/2015 | Cosse | |
| 2015/0359611 | A1 | 12/2015 | Rudman | |
| 2016/0000530 | A1 | 1/2016 | Hagelganz et al. | |
| 2016/0045284 | A1 | 2/2016 | Damon et al. | |
| 2016/0045285 | A1 | 2/2016 | Damon et al. | |
| 2016/0045286 | A1 | 2/2016 | Damon et al. | |
| 2017/0172707 | A1 | 6/2017 | Damon et al. | |
| 2017/0172708 | A1 * | 6/2017 | Damon | A61C 7/287 |
| 2018/0168777 | A1 | 6/2018 | Damon et al. | |

FOREIGN PATENT DOCUMENTS

| | | | |
|---|---|---|---|
| CN | 201642385 | U | 11/2010 |
| CN | 102159154 | A | 8/2011 |
| CN | 102802556 | A | 11/2012 |
| CN | 202654253 | U | 1/2013 |
| CN | 103349571 | A | 10/2013 |
| CN | 105473079 | A | 4/2016 |
| CN | 106308957 | A | 1/2017 |
| CN | 107530152 | A | 1/2018 |
| EP | 2457535 | A1 | 5/2012 |
| FR | 2710830 | A1 | 7/1993 |
| GB | 2130492 | A | 6/1984 |
| JP | 2009535174 | A | 10/2009 |
| JP | 2011025070 | A | 2/2011 |
| JP | 2012065897 | A | 4/2012 |
| JP | 2014094288 | A | 5/2014 |
| RU | 114840 | U1 | 4/2012 |
| WO | 9400072 | A1 | 1/1994 |
| WO | 9509580 | A1 | 4/1995 |
| WO | 2006024119 | A2 | 10/2006 |
| WO | 2008142690 | A2 | 1/2009 |
| WO | 2009078031 | A1 | 6/2009 |
| WO | 2010019768 | A1 | 2/2010 |
| WO | 2011141937 | A1 | 11/2011 |
| WO | 2012141937 | A1 | 11/2011 |
| WO | 2014123670 | A1 | 8/2014 |
| WO | 2015026400 | A2 | 7/2015 |
| WO | 2017112004 | A1 | 6/2017 |
| WO | 2018057118 | A1 | 3/2018 |
| WO | 2019160830 | A1 | 8/2019 |

OTHER PUBLICATIONS

Office Action dated Apr. 30, 2015.

International Search Report (ISR) for WO/2015026400 (also known as PCT/US2014/033952) issued May 29, 2015.

PCT Search Report dated Apr. 14, 2014 for PCT/US2014/011613.

International Search Report and the Written Opinion of the International Searching Authority, Oct. 14, 2016, PCT/US2016/045508.

International Preliminary Report on Patentability, PCT/US16/45508, Jan. 16, 2018.

Notification of Transmittal of the International Search Report and the Written Opinion of the International Searching Authority, or the Declaration, PCT/US17/44310, Aug. 16, 2017.

Folgmann, Drew S, Office Action, U.S. Appl. No. 14/976,074 , Jul. 25, 2017.

Search Report dated Jul. 28, 2021 for PCT/US2021/027206.

Canadian Patent Office, Office Action in corresponding Canadian Application No. 2,994,283 dated Jun. 6, 2018.

New Zealand Intellectual Property Office, Office Action in corresponding New Zealand Patent Application No. 739415 dated Nov. 2, 2018.

Australian Patent Office, Office Action in corresponding Australian Application No. 2016375591 dated Dec. 10, 2018.

International Bureau of WIPO, International Preliminary Report on Patentability in corresponding International Patent Application No. PCT/US2017/044310, dated Mar. 26, 2019.

European Patent Office, extended European Search Report in corresponding European Application No. 16879523.5 dated Jul. 23, 2019.

(56) References Cited

OTHER PUBLICATIONS

U.S. Patent and Trademark Office, Office Action in corresponding U.S. Appl. No. 15/271,894 dated Dec. 31, 2019.
Russian Patent Office, Official Action issued in RU 2019111709 mailed on Feb. 17, 2020.
Chinese Patent Office, Office Action in corresponding Chinese Patent Application No. 201680026956.6 dated Jul. 29, 2019.
Major et al., "Investigation into the Mechanical Characteristics of Select Self-Litigated Brackets at a Series of Clinically Relevant Maximum Torquing Angles: Loading and Unloading Curves and Bracket Deformation.", European Journal of Orthodontics, vol. 35, Issue 6, Dec. 2013, pp. 719-729.
European Patent Office, Partial Search Report issued in EP17853594.4 mailed on May 18, 2020.
Korean Patent Office, Decision of Rejection issued in KR 10-2018-7003019 mailed on Jul. 30, 2020.
European Patent Office, Extended Search Report issued in EP 17853594.4 mailed on Aug. 9, 2020.
Japanese Patent Office, Office Action issued in JP 2019-536812 mailed on Nov. 24, 2020.
Chinese Patent Office, Office Action issued in CN201780057979.8 mailed on Sep. 23, 2020.
U.S. Patent and Trademark Office, Office Action in corresponding U.S. Appl. No. 14/976,074 dated Oct. 24, 2018.
Korean Patent Office, Notice of Preliminary Rejection issued in KR 10-2018-7003019.
Korean Patent Office, Notice of Final Rejection issued in KR 10-2018-7003019.
New Zealand Patent Office, Examination Report issued in NZ 739415 mailed on May 27, 2019.
Australian Patent Office, Examination Report issued in AU 2016375591 mailed on Feb. 16, 2018.
U.S. Patent and Trademark Office, Office Action issued in U.S. Appl. No. 14/976,074 mailed on Mar. 7, 2018.
Japanese Patent Office, Decision of Rejection issued in JP 2019-536812 mailed on May 25, 2021.
Chinese Patent Office, Office Action issued in CN201780057979.8 mailed on Jun. 24, 2021.
Chinese Patent Office, Office Action issued in CN 201980013319.9 mailed on Jun. 22, 2021.
European Patent Office, Extended European Search Report in corresponding European Application No. 16789743.8 dated Nov. 28, 2018.
International Searching Authority, Search Report and Written Opinion issued in International Application No. PCT/US2019/017575 mailed Jun. 7, 2019 (23 pages).
Japanese Patent Office, Office Action issued in JP 2017-555622 mailed on Apr. 23, 2020, 3 pages.
European Patent Office, Office Action issued in EP 16789743.8 mailed on Jan. 20, 2020, 4 pages.
U.S. Patent and Trademark Office, Office Action issued in corresponding U.S. Appl. No. 14/702,961 mailed on May 15, 2020, 15 pages.
PCT Office, International Preliminary Report on Patentability issued in PCT/US2019/017575 mailed on Aug. 18, 2020.
Japanese Patent Office, Office Action issued in JP 2017-555622 mailed on Mar. 9, 2021.
PCT Office, International Preliminary Report on Patentability issued in PCT/US2021/027208 dated Nov. 8, 2022.
European Patent Office, Communication Pursuant to Article 94(3) EPC issued in EP 17853594.4 mailed on Aug. 7, 2023 (9 pages).
European Patent Office, Extended Search Report issued in EP 21 792 351.5 mailed on Mar. 1, 2024 (10 pages).
European Patent Office, Examination Report issued in EP 21792351.5 dated Apr. 17, 2025.
European Patent Office, Summons to Attend Oral Proceedings pursuant to Rule 115(1)EPC issued in EP 21792351.5 dated Dec. 19, 2025.

* cited by examiner

TWIN

TWIN

TWIN

TWIN

TWIN

PSL

PSL

ASL

PSL

PSL

PSL

PSL

PSL

PSL

PSL

PSL

PSL

PSL

PSL

PSL

PSL

PASSIVE SELF-LIGATION BRACKET ASSEMBLY

RELATED APPLICATIONS

This US Non-Provisional (Utility) patent application claims priority to earlier filed U.S. Provisional Patent Application No. 63/015,528 filed on 25 Apr. 2020 and titled PASSIVE SELF-LIGATION BRACKETS. The entire contents of earlier filed U.S. Provisional Patent Application No. 63/015,528 is expressly incorporated herein, in its entirety, by this reference.

Inventorship of earlier filed U.S. Provisional Patent Application No. 63/015,528 is the same as this US Non-Provisional patent application.

Pursuant to USTPO Rules this priority claim is also being presented in the Application Data Sheet (ADS) filed with this US Non-Provisional patent application.

TECHNICAL FIELD

This invention relates to Orthodontics and more specifically to Passive Self-Ligation (PSL) brackets and methods for the use of such Passive Self-Ligation brackets during orthodontic treatment regimens for treatment and correction of malocclusions and irregular positions of teeth.

BACKGROUND OF THE INVENTION

The profession of Orthodontics has been challenged to develop clinical bracket and archwire technologies that will allow clinicians to correct irregular tooth positions, create ideal arch forms, and achieve outstanding final results in reasonable treatment times. For many years, the challenge has been to create an archwire-bracket assembly that will produce excellent final results without the clinician spending many months bending final finishing archwires to accomplish first order, second order, and third order tooth positions. As shown in the accompanying FIGS. 20A, 20B, 20C, 21A, 21B, and 22, first order tooth control includes rotation and in-out positions of the teeth. Second order tooth control includes paralleling roots and elevation/depression of the teeth. Third order tooth control includes torqueing/tipping the tooth facially or lingually. Torque control (third order control) has been, and continues to be, a major obstacle in orthodontic treatment regimens that has often caused very long and extended treatment times.

As a brief background, in approximately 1926, Dr. E. Angle invented twin brackets and archwire technologies (FIGS. 1A-1D, 2) that relied on the archwire being securely tied with ligature wires against the base wall of a bracket slot, and at a position substantially immediately adjacent to the facial surface of the Twin bracket. At the time, clinicians had not yet realized that tightly tied archwires generated significant binding and friction which made it difficult to move/translate bracketed teeth along the archwire. Several decades later, elastic ligature ties were invented and replaced wire ties to hold archwires tightly against the base of the bracket slots. Although elastic ligature ties were very easy to place, elastic ligature ties still created significant binding and friction that slowed tooth movement and caused lengthened treatment times.

In the years that followed, Active Self-Ligation (ASL) was invented/developed. ASL utilizes an active clip to hold the archwire in the bracket slot and directly frictionally against the slot base wall. Active Self-Ligation was an improvement for clinical mechanics with lighter forces being utilized helping the quality of final treatment outcomes. Unfortunately, ASL technology did not resolve the long felt need for achieving (third order) torque control, and ASL also required precise, and time consuming, archwire bending (intentionally bending torque bends into the archwire) to accomplish third order tooth torque control.

In the early 1990s, Passive Self-Ligation (PSL) was invented/developed. PSL featured a bracket slot with a door or slide that formed the fourth wall of a rectilinear tube. This archwire tube assembly allowed teeth, having PSL brackets attached thereto, to freely slide/translate along the archwire with minimal, or no, binding and friction because the archwire is not “tied” against the base of the bracket slot. Many clinicians have appreciated this technology as a major step forward in achieving ideal final arch forms and first and second order tooth control in less treatment time.

Since the inception of the field of orthodontics, there have been only three major bracket technologies. First: Twin Technology, (Twin). Second: Active Self-Ligation, (ASL). Third: Passive Self-Ligation, (PSL). Each of these bracket technologies are significantly structurally different from one another, and they produce different clinical and biologic responses. Design improvements for each of these three separate technologies are applicable only to that specific technology because the mechanics of one technology are not applicable to the mechanics of the others. For example, a new and improved “active clip” that improves performance in ASL has no applicability in the context of twin technology, nor in PSL technology. Each technology therefore, necessarily stands on its own.

Despite technologic improvements, the most challenging issue for clinical orthodontics has remained the development of a bracket-archwire assembly that not only achieves first order and second order tooth control, but also achieves third order torque control while utilizing low biologic treatment forces throughout the treatment regimen. The object of the instant invention is to bring to orthodontists and clinicians, a new bracket-archwire assembly for passive self-ligation (PSL) that not only achieves first order and second order tooth control very early in treatment, but also provides third order torque tooth control utilizing very low biologic clinical forces to achieve ideal final results, and outstanding arch forms and in less treatment time. Further, with proper bracket positioning, minimal or no bending of the final finishing archwires is required.

The invention presented herein provides Passive Self-Ligation (PSL) brackets for each tooth with each individual bracket uniquely featuring two separate torque expressing locations to achieve total tooth control in all planes of space (X, Y, Z). The two torque expressing locations are: (1) a base pad area that exerts “standard/neutral torque” to maintain plural bracket assemblies (and the outlines of the plural bracket assemblies) parallel with one another in both the vertical and the horizontal plane; and (2) a mid bracket body. When inserting a finishing archwire, the combined assemblies express first, second, and now third order control (torque control) to the attached tooth without bending finishing archwires.

A first bracket assembly defines a uniquely shaped archwire tube, and when a finishing archwire is releasably engaged within the uniquely shaped archwire tube, the first bracket assembly expresses a high torqueing couple to a tooth to achieve final tooth position. A second bracket assembly also defines a new uniquely shaped archwire tube wherein the archwire tube’s upper and lower walls are angled in the opposite direction, and when engaged with the same finishing archwire, the second bracket assembly expresses a low torqueing couple to a tooth to achieve final tooth position.

Both the center of the archwire tube, and the center of the archwire carried within the archwire tube, are positioned near a mid-bracket body, and spaced apart from the facial surface of the bracket body, to provide horizontal and vertical center slot lineup for easy bracket placement and archwire insertion and removal. The centers of the brackets always remain aligned in the horizontal and vertical planes. For the first time in passive self-ligation bracket history, this assembly not only achieves ideal first and second order tooth control, but now third order torque control utilizing very light biologic forces to the teeth. The present invention eliminates the need for clinicians to bend final torques into finishing archwires for each tooth, which eliminates a difficult, challenging, and time consuming task that was previously required. This new invention will save months of treatment time with long term positive bone and tissue responses.

Prior art teachings and drawings (FIG. 1A thru FIG. 9B) are provided to highlight the significant design and performance differences between Twin brackets, Active Self-Ligation (ASL) brackets, and Passive Self-Ligation (PSL) brackets.

FIG. 1A and FIG. 2 show the differences between Torque in Face 313, (FIG. 1A) and Torque in Base 315, (FIG. 2) which have been the standard for bracket designs for many years. Prior Art FIGS. 1A, 1B, 1C and 1D all show "Torque in Face" 313. This prior art technology was utilized sparingly due to the challenges of accurately achieving three-dimensional control of the teeth. Different torques on adjacent teeth created a significant problem shown in FIG. 1B by lines drawn through the centers of high and low torqueing bracket slots highlighting how the centers of the slots move vertically a distance 314 which negatively impacts treatment mechanics and final tooth positions.

Another problem is shown in FIGS. 1C and 1D, with reference line 301 representing the occlusal plane, and line 302 representing the bracket slot center plane. As demonstrated in FIGS. 1C and 1D, the prior art Twin bracket in FIG. 1C, when attached to a lower second bicuspid 316, generates an angle 321 relative to the vertical plane (line 160). In contrast, the Twin bracket shown in FIG. 1D, when attached to a lower central incisor 316A, generates angle 322. Angle 321 and angle 322 are substantially different from one another.

Prior art FIGS. 1C and 1D illustrate how the bracket face angle 317 of one ASL bracket (FIG. 1D) is parallel to the vertical plane 160, while the bracket face angle 317 of another ASL bracket (FIG. 1C) is not parallel to the vertical plane 160. When all torque is located in the bracket face, it is impossible to keep the base portion of the bracket slot and the bracket face angle 317 parallel with the vertical plane 160 when moving from tooth to tooth around the upper and lower dental arches due to changing shapes and angles of each tooth's facial contours.

As shown in Prior Art FIG. 1B, the vertical movement 314 of the slot centers (which is also the center of the archwire 18) caused by changing the torque angle in the bracket limits the use of "torque in face" 313 because the slots cannot be aligned without mal-positioning the teeth. Another challenge for Twin Technology is that archwires 18 are securely tied against the base of the bracket slot with wire ligatures or elastic ties that cause/generate binding and friction that requires significantly higher treatment forces to move teeth. Over time, clinicians have widely come to recognize that exerting excessive clinical forces limits/slows tooth movement; diminishes treatment planning options; dramatically lengthens treatment times; and can cause long-term tissue damage to bone and tissue.

FIG. 2 shows a prior art Twin Bracket that has all torque in base-pad area 315 ("Torque in base"). As discussed previously, placing all torque in the pad-base area 315 allows Twin Brackets to have bracket slots and bracket faces that remain in the same relative position (parallel to both the vertical 160 and horizontal 180 planes) making it easier to place brackets and to insert archwires 18 to improve clinical performance. Even though "Torque in Base" 315 was an advancement for first order and second order tooth control, "Torque in Base" 315 has still not resolved the need to achieve third order control or torque control of teeth without the time-consuming and complicated process of bending archwires.

Experienced clinicians often state, "If I have to make more than one torque bend in an archwire, I cannot predict what the end result will be."

A second recognized drawback to Twin Brackets is the "Tying-In" or positionally securing archwires 18 frictionally against the base of the bracket slot. "Tying-In" causes/generates binding and friction between the archwire 18 and of the bracket, and the binding/friction necessitates use of excess biologic treatment forces to overcome the friction and the binding. These excessive forces negatively impact treatment options and contributes to a significant increase in numbers of patients requiring extractions (tooth removal). Evaluation of over 900 orthodontic patients treated at the University of Washington Orthodontic Department, who were required to have tooth extractions, shows only 10 percent (10%) of these patients were stable 20 years post treatment, with many showing negative bone and tissue responses that may be attributable to the excessive forces required in Twin Bracket treatment.

Active Self-Ligation (ASL) was introduced to orthodontics in the mid-late 1970's by Dr. H. Hanson. Active Self-Ligation (ASL), shown in Prior Art FIG. 3 was an advancement for clinical orthodontics because a flexible spring clip 323 is used to hold the archwire 18 against the base wall of the bracket slot. The advancements provided by Active Self-Ligation (ASL) included making it easier and faster to change archwires 18. However, ASL still "seats" the archwire 18 directly and frictionally against the base of the bracket slot and still generates binding and friction, but to a lesser degree. First order and second order tooth control is achieved. However, generating third order torque control still requires bending torque of bends into archwires by the clinician. Although an improvement over Twin Technology, ASL did not resolve the need for third order tooth torque control.

Passive Self-Ligation (PSL), Prior Art FIGS. 3A, 3AA, 3B and 3C was introduced to orthodontics by Dr. D. Damon with U.S. Pat. No. 5,275,557 in 1994. Passive Self-Ligation (PSL) utilizes Torque in Base 315, but added a rigid door/slide 330 on a facial surface of the PSL bracket providing a fourth wall to the archwire slot, effectively creating a rectangular tube defined by the bracket body. Passive Self-Ligation (PSL) changed treatment mechanics because the bracket slot was now a tube that did not require the archwire 18 to be tied-in, or held tightly and frictionally against, the base of the slot. Passive Self-Ligation (PSL) dramatically reduced binding and friction between the bracket slot and the archwire 18 and allows brackets (and teeth) to slide/translate along the archwire. Passive Self-Ligation (PSL) utilizes less/lighter biologic clinical forces to move teeth as desired for the treatment regimen. The design advancement provided by PSL changed treatment planning and mechanics by significantly lowering clinical forces and has diminished the number of patients requiring tooth extractions.

Voluminous research has been conducted on the cellular biology of tooth movement and its long-term impact on bone, tissue, and patient health. Such research has shown that cell differentiation of mesenchymal (undifferentiated) cells to osteoblasts and osteoclasts result from forces being applied to a tooth. Published reports have suggested that oxygen must be present for this cell differentiation to take place. Other reports have shown greater tooth movement is achieved using a low continuous force in comparison to using a high force. A low continuous force has been demonstrated to show a much healthier cellular environment in the periodontal ligament with positive impact on bone and tissue for the long term.

Evidence from thousands of CT Scans taken worldwide since 2004 has proven that less/lighter clinical forces exerted by PSL brackets has reduced the negative bone and tissue response caused by Twin Brackets and by ASL treatment years post treatment. PSL has changed the performance of the first one-third of treatment showing significant early alignment of teeth and developing ideal "Natural Arch forms" with relative ease. However, utilizing known PSL brackets, during the last two-thirds of treatment still required significant time and effort to achieve final third Order "Torque Tooth Control" because finishing archwires still needed to be bent by clinicians to provide torque, which continued to lengthen treatment times more than desired by both patients and clinicians.

FIG. 3B, shows another prior art passive self-ligating bracket design. (U.S. Pat. No. 5,322,435 by Dr. E. Pletcher). The Pletcher bracket provides a slide/door 330 that is supported above and below the bracket slot. The Pletcher design provided improved strength, however, both the upper and lower dental arch brackets opened vertically or in the "sight-line" of the clinician making archwire positioning in the bracket slot challenging to visualize during door opening or closing. The Pletcher bracket also lacked tie-wings for placing often needed auxiliaries or elastics, but had the advantage of being small for positive esthetics and comfort.

A further advancement in PSL is U.S. Pat. No. 6,071,118 to Dr. D. Damon (Jun. 6, 2000) and is shown in Prior Art FIG. 3C. The FIG. 3C bracket has upper 190 and lower 191 tie-wings with a door 330 on the facial surface of the bracket. This bracket design incorporates Torque in Base 315 that maintains the bracket slots aligned from tooth-to-tooth throughout the upper and lower dental arches. A rectangular archwire 18 is shown in a torqued position within in the rectilinear bracket slot. The advantages of U.S. Pat. No. 6,071,118 included the door 330 only opening inferiorly in both the upper and lower dental arches due to the door support only being on the inferior side of the bracket slot. U.S. Pat. No. 6,071,118 provided clinicians with a clear view of the bracket slot making archwire insertion and removal easy.

Prior art FIGS. 4A, 4B, 5A, 5B, 5C and 6 (showing U.S. Pat. No. 5,464,347 to Oda-Damon, 2010) was the next evolution of a PSL bracket. However, as shown in FIGS. 4A and 4B the bracket still only provided neutral or standard torque in the base-pad area with a neutral positioned bracket slot. This bracket did not resolve the need for clinicians to bend torque bends into archwires to accomplish third order Torque Control of the teeth.

Prior art FIGS. 5A, 53 and 5C of the PSL brackets of U.S. Pat. No. 5,464,347 show how the complexity of support for the door, while achieving standard or neutral torque in the bracket slot is challenging. Prior art FIG. 5B and FIG. 5C show how the facial surface 412 of a lower first molar bracket must be angled to accommodate the contour of tooth face angles and occlusions that may have resulted from the upper first molar biting against the bracket's occlusal surface 422. To provide the rectangular bracket slot 416, the inside superior portion of the door 330 in FIG. 5C had to be beveled 331 to close the slot and form a rectangular standard or neutral shaped bracket slot.

Prior art FIG. 6 is an orthographic side view of an upper first molar bracket further highlighting the challenges present to achieve neutral or standard torque.

Prior art FIGS. 7, 8A, 8B and 9A show orthographic side views of prior art PSL brackets illustrating various challenges faced in designing/manufacturing a PSL bracket—that produces third order torque control without having to bend archwires, while maintaining ideal first order and a second order tooth control. Prior art FIG. 7 shows a non-torqueing passive self-ligation bracket with neutral (standard) torque placed in the base-pad area and neutral torque in the bracket slot. It is important to note that the bracket body 12 and the upper and lower (superior/inferior respectively) walls of the bracket slot are all parallel with horizontal plane 180. The bracket slot base wall and the inside surface of the door/slide are both parallel to the vertical plane 160. The rectangular archwire 18 within the bracket slot is in a neutral position and exerts no torque. The "fine line" outline of a finishing archwire 17 (FIG. 7) is superimposed over the rectangular archwire 16 showing that torque must be bent (by the clinician) into the finishing archwire 17 and inserted into the bracket slot to have any effect on third order tooth torque control.

Prior art FIG. 8A and FIG. 8B illustrate another attempt by the industry to design a high and low torqueing passive self-ligation bracket assembly to achieve third order control or torque control without needing to bend finishing edgewise archwires. As shown in prior art FIGS. 8A and 8B, in order to maintain the generally rectangular configuration of the bracket slot 19 while retaining the structural support required for the door 14, the bracket body 12 was designed to remain parallel with the upper wall 46 and lower wall 47 of the bracket slot 19. The bracket slot base 43 and back 45 of the door 14 were therefore required to be perpendicular to the upper 46 and lower 47 slot walls to maintain the generally rectangular shaped bracket slot 19. However, as a result of maintaining these orientations, the bracket body and the bracket slot base 43 and back 45 of the door 14 were no longer parallel to both the horizontal 180 and vertical 160 planes respectively. As shown in prior art FIGS. 8A and 8B, (which are aligned with one another) horizontal lines 180 pass through the center of both bracket slots and archwire 18. However, while the brackets shown in FIGS. 8A and 8B are aligned for proper orientation on a patient's teeth, the centers of the bracket slots 19 (and archwires 18) move in the vertical direction a distance of 420 which is nearly the full height dimension of the bracket slot. The result of installing an archwire 18 in these vertically misaligned slots is patient pain, and excessive biologic forces exerted on the teeth.

In order to make the prior art brackets shown in FIGS. 8A, 8B functional for exerting any torque control, the bracket body 12 of FIG. 8A is at 78° to vertical plane 160 and the bracket of FIG. 8B is 102° to the vertical plane 160 which generated further drawbacks including structural weaknesses in the bracket, and uneven tie wing spacing.

Prior art FIG. 9A shows the low torqueing bracket body 8A super-imposed over the hi torqueing bracket body 8B and illustrates the difficulty of aligning the bracket slots, bracket bodies, and bracket faces due to the vertical displacement of the bracket slots shown.

The bracket slot vertical movement 420 (FIG. 9A) makes placement of high torque brackets (FIG. 8A) and low torque brackets (FIG. 8B) nearly impossible for clinicians. Still further, as shown in FIG. 9A, the vertical lines 160 passing through the center bracket slots 18 are off by the in-out dimension 423 which negatively impacts final in-out (first order) tooth position. These continuing problems have made the profession of orthodontics seek solutions to these continuing significant clinical issues.

The current Passive Self-Ligation (PSL) bracket assembly provides a solution for, and resolves various, and numerous, of the aforementioned continuing problems faced in the profession of orthodontics.

SUMMARY OF THE INVENTION

A principal aspect of the present invention is a passive self-ligation bracket assembly for releasable attachment to a facial surface of a tooth, and for slidable engagement with an archwire to effect treatment of malocclusions and tooth alignment and for expressing a predetermined torque upon a tooth without pre-bending of the archwire, the passive self-ligation orthodontic bracket assembly comprising: a bracket body having a facial end portion, a lingual end portion, and a mid-body portion between the facial end portion and the lingual end portion, a superior facing surface and an inferior facing surface, and the inferior facing surface is parallel to, and spaced apart from, the superior facing surface, and the bracket body defines an archwire slot that extends into the bracket body, and the archwire slot has an upper wall proximate the superior facing surface, and a lower wall proximate the inferior facing surface and the lower wall is spaced apart from, and parallel to the upper wall, by a predetermined distance, and the archwire slot further has a base wall that communicates between the upper wall and the lower wall opposite the facial end portion of the bracket body, and the base wall is perpendicular to the both the superior facing surface and the inferior facing surface of the bracket body, and the upper wall and lower wall of the bracket slot are not parallel to the superior and inferior facing surfaces, and the archwire slot defines a slot center, and defines a gateway that communicates with the facial end portion of the bracket body, and the archwire slot is sized to receive the archwire therein; a bracket base pad is structurally carried at the lingual end portion of the bracket body, and the bracket base pad configured for releasable attachment to the facial surface of the tooth; and a facial facing surface of the facial end portion of the bracket body is configured to carry a movable door, and wherein the movable door has a facial facing surface and a lingual facing surface, and two opposing lateral edges, and the movable door is further slidably movable between an open position relative to the gateway of the archwire slot, and a closed position relative to the gateway of the archwire slot, and wherein, when the moveable door is in the closed position, the lingual facing surface of the moveable door and the archwire slot define an archwire tube that is defined by plural spaced apart corners, none of which are right angles, and wherein the archwire tube releasably encloses and slidably cooperates with the archwire to apply the predetermined torque to the bracket body at the slot center to effect desired first, second, and third order movements to the tooth, and wherein the archwire is freely axially slidably movable within the archwire tube and relative to the bracket body, and wherein the lingual facing surface of the moveable door is parallel to the archwire slot base wall; and wherein the upper and lower walls of the archwire tube have a predetermined angular orientation/slope relative to the superior and inferior facing surfaces of the bracket body so as to generate and direct the predetermined torque to the tooth and effect a resulting movement of the tooth; and wherein the archwire that is carried within the archwire tube is not pre-bent to impart the predetermined torque.

A further aspect of the present invention is a passive self-ligation bracket for treating malocclusions and tooth alignment that, in cooperation with an archwire, expresses torque upon a tooth from plural locations to provide tooth control in a vertical plane (Y-axis), horizontal plane (X-axis) and Z-axis plane, comprising: the passive self-ligation bracket has a bracket body and a movable door that is slidably engaged with the bracket body at one end portion thereof; a base pad area of the bracket body that is configured for attachment to the tooth, and opposite the movable door, that expresses standard/neutral torque upon the tooth to maintain the bracket body in a position aligned in the vertical plane and in the horizontal plane with adjacent bracket bodies attached to adjacent teeth; a mid-body portion of the bracket body, between the base pad area and the movable door; an archwire slot defined in the bracket body, and having a base wall, an upper wall and a lower wall, and the archwire slot, in combination with a lingual facing surface of the movable door forms an archwire tube that is defined by plural spaced apart corners none of which are right angles, and two vertically adjacent corners of the archwire tube, proximate the base pad area are defined by arcs, and wherein the base wall and lingual facing surface of the movable door are both parallel to the vertical plane, and the upper and lower walls are spaced apart from one another by a predetermined distance and are parallel to one another and the upper and lower walls are both sloped relative to the horizontal plane, and the slope of the upper and lower walls relative to the horizontal plane expresses either a high torque couple, or a low torque couple upon the tooth when the archwire is engaged within the archwire tube; and the archwire tube has a center and the archwire tube is located in the mid-body portion to provide horizontal and vertical center level slot lineup so as to provide first, second and third order tooth control to the tooth, without pre-bending torque bends into the archwire.

A further aspect of the present invention is a passive self-ligation bracket and wherein the archwire tube is defined by interior facing surfaces of more than four spaced apart linear surfaces with corners between and interconnecting the more than four spaced apart linear surfaces.

A further aspect of the present invention is a passive self-ligation bracket further comprising: a gateway wall within the archwire tube, and the gateway wall is parallel with the horizontal plane and is adjacent the movable door.

A further aspect of the present invention is a passive self-ligation bracket further comprising: a gateway defined in the end portion of the bracket body that carries the movable door and the gateway communicates with the archwire slot, and the gateway has a vertical dimension that is greater than the predetermined dimension of the archwire slot between the upper and lower walls.

A further aspect of the present invention is a passive self-ligation bracket wherein the base wall of the archwire slot has a mid-wall portion that is linear and is parallel with the vertical plane, and the mid-wall portion is located between the two arcs that form two of the spaced apart corners, and one arc communicates between the mid-wall portion and the upper wall, and the one arc communicates between the mid-wall and the lower wall, and the mid wall has a middle that is horizontally aligned with the center of the archwire slot.

A further aspect of the present invention is a passive self-ligation bracket and wherein the amount of torque expressed upon the tooth is dependent upon the predetermined distance between the upper wall and the lower wall of the archwire slot.

A further aspect of the present invention is a passive self-ligation bracket and wherein the amount of torque expressed upon the tooth can be changed by changing the predetermined distance between the upper wall and the lower wall of the archwire slot.

A further aspect of the present invention is a passive self-ligation bracket wherein the archwire has a superior facing surface and a spaced apart inferior facing surface with a predetermined thickness dimension therebetween, and the amount of torque expressed upon the tooth by the passive self-ligation bracket is dependent upon the predetermined thickness dimension between the superior facing surface and the inferior facing surface of the archwire.

A further aspect of the present invention is a passive self-ligation bracket assembly wherein the amount of torque, and the direction of torque, expressed upon the tooth is dependent upon the slope of the upper and lower walls of the archwire tube relative to the horizontal plane.

A further aspect of the present invention is a passive self-ligation bracket and wherein the amount of torque expressed upon the tooth can be changed by changing the slope of the upper and lower walls of the archwire tube relative to the horizontal plane.

A further aspect of the present invention is a passive self-ligation bracket and wherein the archwire within the archwire tube only has single point contacts with interior facing surfaces of the archwire tube.

A further aspect of the present invention is a passive self-ligation bracket assembly system for correcting malocclusions and tooth alignment, comprising: a first passive self-ligation bracket and a second passive self-ligation bracket, each of the first passive self-ligation bracket and the second passive self-ligation bracket having, a bracket body having a facial end portion, a lingual end portion carrying a bracket base pad configured for adherence to a tooth, and a mid-body portion between the facial end portion and the lingual end portion, a movable door engaged with the bracket body at the facial end portion, means for exerting a predetermined amount of torque, and a predetermined direction of torque on a tooth from the lingual end portion and from the mid-body portion, and the means for exerting the predetermined torque is defined in the mid-body portion, and has a center; and an archwire slidably engaged within the means of the first passive self-ligation bracket and slidably engaged within the means of the second passive self-ligation bracket for exerting the predetermined torque.

A further aspect of the present invention is a passive self-ligation bracket and wherein the means exerts a high torque couple, or a low torque couple, or a standard/neutral torque couple upon the tooth.

A further aspect of the present invention is a passive self-ligation bracket and wherein, the archwire has no torque bends therein prior to engagement with the means, and the archwire physically contacts each respective means at plural spaced apart single point contacts to exert the predetermined torque.

A further aspect of the present invention is a passive self-ligation bracket and wherein the archwire tube is defined by more than four linear and inwardly facing surfaces of a periphery of the archwire tube, and corners interconnect the more than four linear and inwardly facing surfaces.

A further aspect of the present invention is a passive self-ligation bracket assembly system wherein, when the first passive self-ligation bracket and the second passive self-ligation bracket are properly oriented for correcting malocclusions and tooth alignment, the center of the means of the first passive self-ligation bracket, and the center of the means of the second passive self-ligation bracket are horizontally aligned and are vertically aligned to provide center level slot line-up.

A further aspect of the present invention is a passive self-ligation bracket system wherein the predetermined torque is exerted from the mid-body portion.

A further aspect of the present invention is a passive self-ligation bracket system wherein the bracket base pad that is structurally carried at the lingual end portion of the bracket body is oriented, relative to the bracket body, at an angle relative to a vertical line that is perpendicular to both the superior facing surface and the inferior facing surface of the bracket body, and the angle of the bracket base pad relative to the bracket body orients the mid-body portion of the bracket body in a neutral/standard torque orientation relative to the tooth.

A further aspect of the present invention is a passive self-ligation bracket system wherein the bracket body, and the movable door, are formed of a material that is generally transparent, or generally translucent, which may include, but is not limited to metal or Translucent Zirconia.

A further aspect of the present invention is a passive self-ligation bracket system wherein the bracket body, and the movable door, are formed of a ceramic.

A further aspect of the present invention is a passive self-ligation bracket assembly and further comprises a superior tie wing space defined between a lingual facing surface of a superior tie wing and the bracket base pad; an inferior tie wing space defined between a lingual facing surface of an inferior tie wing and the bracket base pad; and the superior tie wing space and the inferior tie wing space are substantially similar in dimensions.

A further aspect of the present invention is a passive self-ligation bracket system wherein the center defined by the archwire tube is horizontally and vertically aligned with a center of the archwire tube of an adjacent self-ligation orthodontic bracket when a plurality of self-ligation orthodontic brackets is oriented for treating the malocclusion or tooth alignment.

A further aspect of the present invention is a passive self-ligation bracket system wherein the archwire tube has a predetermined height dimension between the upper wall and the lower wall of the archwire slot, and wherein the archwire has a predetermined thickness dimension between a superior facing surface and an inferior facing surface thereof, and wherein the predetermined thickness dimension of the archwire imparts a torque force to the bracket body, at the mid-body of the bracket body, to direct third order control to the respective tooth, while two diametrically opposed lateral surfaces of the archwire direct first and second order control of the respective tooth.

A further aspect of the present invention is a passive self-ligation bracket system wherein each of the first and second passive self-ligation orthodontic brackets presents a substantially identical exterior appearance, and wherein the similar exterior appearance of the respective passive self-ligation orthodontic brackets facilitates placement of the respective passive self-ligation orthodontic brackets on the respective facial surfaces of first and second teeth of the patient and facilitates center level archwire slot line-up.

A further aspect of the present invention is a passive self-ligation bracket system wherein the archwire has a substantially uniform cross-sectional shape and has a superior facing surface and an inferior facing surface, and the superior facing surface and the inferior facing surface are spaced apart by a predetermined thickness dimension, are parallel to one another, and extend between and connect two diametrically opposed radially curved surfaces.

A further aspect of the present invention is a passive self-ligation bracket system wherein the archwire has a predetermined diameter between the two diametrically opposed lateral radially curved surfaces, and wherein the predetermined diameter is selected to maintain a consistent first and second order control of the teeth when the archwire is within the archwire tube and cooperating with the respective bracket bodies, and wherein the predetermined thickness dimension of the archwire between the superior facing surface and the inferior facing surface controls an application of torque force to the respective bracket bodies to direct third order tooth movements to the first and second teeth of the patient.

A further aspect of the present invention is a passive self-ligation bracket system wherein each of the two diametrically opposed radially curved surfaces of the archwire each contact an interior facing surface of the archwire tube at only a single points of contact.

A further aspect of the present invention is a passive self-ligation bracket assembly system wherein the two diametrically opposed radially curved surfaces of the archwire are arcs having a common center.

A further aspect of the present invention is a passive self-ligation bracket system, further comprising: an additional plurality of passive self-ligation orthodontic brackets, each of the plurality of additional plurality of orthodontic brackets having bracket bodies and movable doors substantially similar to the first and second passive self-ligation orthodontic brackets, and wherein the additional plurality of passive self-ligation orthodontic brackets have angular orientations/slopes of their respective archwire tubes relative to their respective bracket bodies and are releasably affixed to respective teeth of the patient, and wherein the additional plurality of passive self-ligation orthodontic brackets align to the center level archwire slot line-up, and slidably cooperate with the archwire, and wherein the archwire is not intentionally distorted to assume a shape different from an original first configuration so as to impart a force to the teeth.

A further aspect of the present invention is a passive self-ligation bracket system further comprising: a second archwire having a second configuration, and wherein the second archwire has a substantially uniform cross-sectional shape, and wherein the substantially uniform cross-sectional shape has only two diametrically opposed lateral radially curved surfaces, and further has a superior facing surface and an opposing inferior facing surface, and the superior facing surface and the opposing inferior facing surface are spaced apart and parallel, and extend between and connect the two diametrically opposed lateral radially curved surfaces, and wherein a dimension between the superior facing surface and the opposing inferior facing surface of the second archwire is different from that of the archwire.

A still further aspect of the present invention is a method of using a plurality of passive self-ligation orthodontic brackets to treat malocclusions and tooth alignment, and for expressing third order torque control to teeth without pre-bending an archwire, the method comprising the steps: providing a first and a second passive self-ligation orthodontic bracket, each of the first passive self-ligation orthodontic bracket and the second passive self-ligation orthodontic bracket having a bracket body, each bracket body having a facial end portion with a facial surface, a lingual end portion, and a mid-body portion between the facial end portion and the lingual end portion, a superior facing surface and an inferior facing surface that is parallel to the superior facing surface, each bracket body further defining an archwire slot that extends into the bracket body, and the archwire slot has an upper wall proximate the superior facing surface, and a lower wall proximate the inferior facing surface, and the lower wall is parallel to the upper wall, and spaced apart from the upper wall by a predetermined height dimension, and a base wall that communicates between the upper wall and the lower wall opposite the facial surface of the bracket body, and the base wall is perpendicular to the both the superior facing surface and the inferior facing surface of the bracket body, and the archwire slot defines a slot center, and the archwire slot defines a gateway that communicates with the facial surface of the bracket body and the archwire slot is sized to receive the archwire therein; the first and second bracket bodies each have a bracket base pad is structurally carried at the lingual end portion of the bracket body, the bracket base pad configured for releasable adhesive attachment to the facial surface of a first tooth and to a second tooth, and each bracket base pad is oriented, relative to the respective bracket body, and relative to a vertical line that is perpendicular to the superior and inferior surfaces of the respective bracket body, at a predetermined angle/slope to express a predetermined torque force on the respective first tooth or second tooth; each bracket body having a superior tie wing integrally carried by the bracket body on the superior facing surface at the facial end portion and vertically above the gateway to the archwire slot; each bracket body having an inferior tie wing integrally carried by the bracket body on the inferior facing surface at the facial end portion and vertically below the gateway to the archwire slot; and the facial end portion of the each bracket body is configured to slidably carry a movable door, and wherein the movable door has a facial facing surface and an opposing lingual facing surface, and two opposing lateral edges, and is further slidably movable between an open position relative to the gateway of the archwire slot, and a closed position relative to the gateway of the archwire slot, and wherein, when the moveable door is in the closed position relative to the gateway of the archwire slot, the lingual facing surface of the moveable door and the archwire slot define an archwire tube having a cross-sectional, shape that is defined by plural corners, none of which are right angles, and wherein the archwire tube encloses and cooperates with the archwire to apply a predetermined force to the first bracket body and to the second bracket body to effect first, second, or third order movements to the first tooth and to the second tooth, and wherein the archwire is axially slidably movable within each archwire tube and relative to the first bracket body and relative to the second bracket body, and wherein the lingual facing surface of the moveable door of each bracket body is parallel to the respective bracket slot base wall; and wherein the archwire tube of each bracket body has a predetermined angular orientation/slope relative to the superior and inferior facing surfaces of the respective bracket body so as to direct a predetermined force to the tooth to which the passive self-ligation orthodontic bracket is attached so as to effect a resulting movement of the tooth; affixing the first passive self-ligation orthodontic bracket to the facial surface of a first tooth; vertically aligning and affixing the second passive self-ligation orthodontic bracket to the facial surface of a second tooth so that the second passive self-ligation orthodontic bracket is vertically aligned with the first passive self-ligation bracket affixed to the first tooth; providing an archwire that has no intentionally formed torque bends therein and has a substantially uniform cross-sectional shape, and wherein the substantially uniform cross-sectional shape has a generally planar superior surface, a generally planar inferior surface that is parallel to and spaced apart from the generally planar superior surface by a predetermined thickness dimension, and the archwire has two diametrically opposed lateral surfaces, and the archwire has a first original configuration that is representative of a dental arch of a patient; placing the archwire within the archwire slot of the first bracket body and placing the archwire within the archwire slot of the second passive self-ligation bracket body, and thereafter moving the movable door of the first passive self-ligation orthodontic bracket to a closed position and thereafter moving the movable door of the second passive self-ligation orthodontic bracket to the closed position, so that the archwire is retained within the respective archwire tubes and can axially slide within the archwire tubes defined by the first passive self-ligation bracket body and by the second passive self-ligation bracket body so as to effect the treatment of the malocclusion and to effect tooth alignment.

A still further aspect of the present invention is a method further comprising a second archwire having a second configuration, and wherein the second archwire has a substantially uniform cross-sectional shape, and wherein the substantially uniform cross-sectional shape has two diametrically opposed lateral surfaces, and further has a superior facing surface and an opposing inferior facing surface, and the superior facing surface and the opposing inferior facing surface are spaced apart and parallel to one another, and extend between and connect the two diametrically opposed lateral surfaces, and wherein a thickness dimension between the superior facing surface and the opposing inferior facing surface of the second archwire is different from that of the archwire.

An even still further aspect of the present invention is a passive self-ligation bracket system wherein the archwire defines a longitudinal axis, and the longitudinal axis of the archwire is axially aligned with the slot center of the archwire slot when the movable door is in a closed position.

An even still further aspect of the present invention is a passive self-ligation bracket system wherein there are only single point contacts between the archwire and the upper and lower walls of the archwire slot provide third order (torque) control while the single point contacts with the base wall and the lingual facing surface of the movable door express first order tooth control.

An even still further aspect of the present invention is a passive self-ligation bracket system wherein the gateway defined in the facial end portion of the bracket body facilitates easy insertion and removal of the archwire from the archwire slot.

An even still further aspect of the present invention is a passive self-ligation bracket system wherein the hi torque force expressed in the archwire slot can be increased or decreased by changing the vertical height dimension between the superior and inferior parallel surfaces of the archwire, and wherein use of "overdrive archwires" (archwires having a greater thickness dimension between the superior and inferior surfaces thereof) facilitates an increase or decrease of torque output without forming torque bends in the archwire prior to placement in the archwire tube.

An even still further aspect of the present invention is a passive self-ligation bracket system wherein the torque values output expressed by the bracket body can be increased or decreased by changing the angle/slope of the upper and lower walls of the archwire slot relative to the horizontal plane while the bracket body remains in the same orientation relative to the vertical and horizontal planes.

These and other aspects, objects and advantages of the present invention will be discussed in greater detail in the application that follows.

BRIEF DESCRIPTIONS OF THE DRAWINGS

Preferred embodiments of the invention are described, below, with reference to the following accompanying drawings.

FIG. 1A is an orthographic side view of a prior art Twin orthodontic bracket illustrating a rectangular archwire slot that expresses all torque in the face 313 with a prior art rectangular shaped archwire 18 positioned in the archwire slot.

FIG. 1B is an orthographic side view of a prior art Twin orthodontic bracket showing both a high torque (torque in face) rectangular archwire slot and a low torque (torque in face) rectangular archwire slot (superimposed over one another), with prior art square or rectangular archwires in both archwire slots and showing how the longitudinal center of each archwire and the centers of the archwire slots move vertically from one bracket to another (distance 314) while remaining horizontally aligned.

FIG. 1C is an orthographic side view of the prior art Twin bracket of FIG. 1A affixed to the facial surface of a lower second bicuspid 316, showing the occlusal plane 301 and the archwire slot plane 302 illustrating how the surfaces of the bracket, represented by lines 311, 312, and 317 are angulated 321, 322 differently relative to the vertical plane 160.

FIG. 1D is an orthographic side view similar to that of FIG. 1C showing the prior art Twin bracket of FIG. 1A affixed to the anterior surface of a lower central incisor 316A, showing the occlusal plane 301 and the archwire slot plane 302, illustrating how the bracket surfaces represented by lines 311, 312, 313 are aligned with line 322 and the vertical plane 160.

FIG. 2 is an orthographic side view of a prior art Twin bracket with all torque in the base 315 showing the bracket face and archwire slot base parallel with the vertical plane 160 and the upper and lower walls of the archwire slot are parallel to the horizontal plane 180.

Figure 1A:
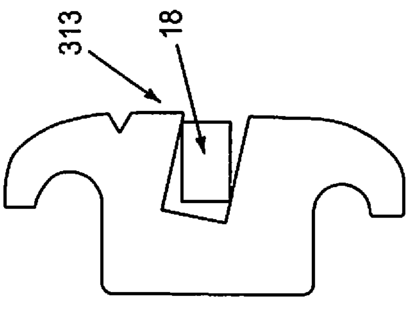
FIG. 1A PRIOR ART
Figure 1B:
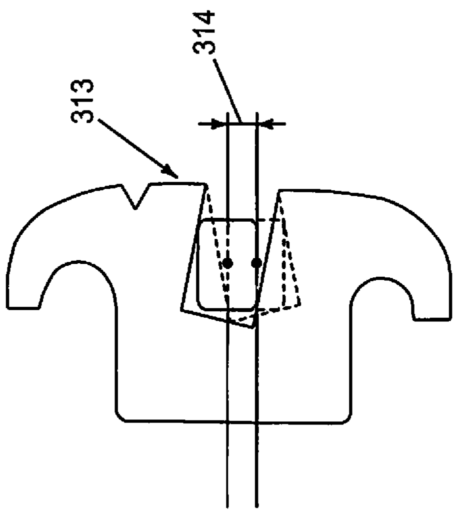
FIG. 1B PRIOR ART
Figure 2:
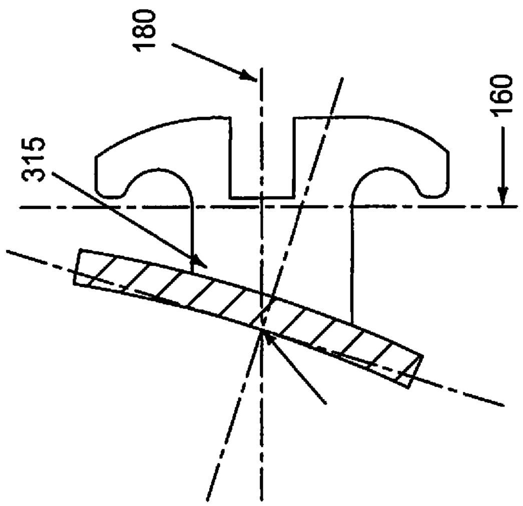
FIG. 2 PRIOR ART
Figures 1C, 1D:
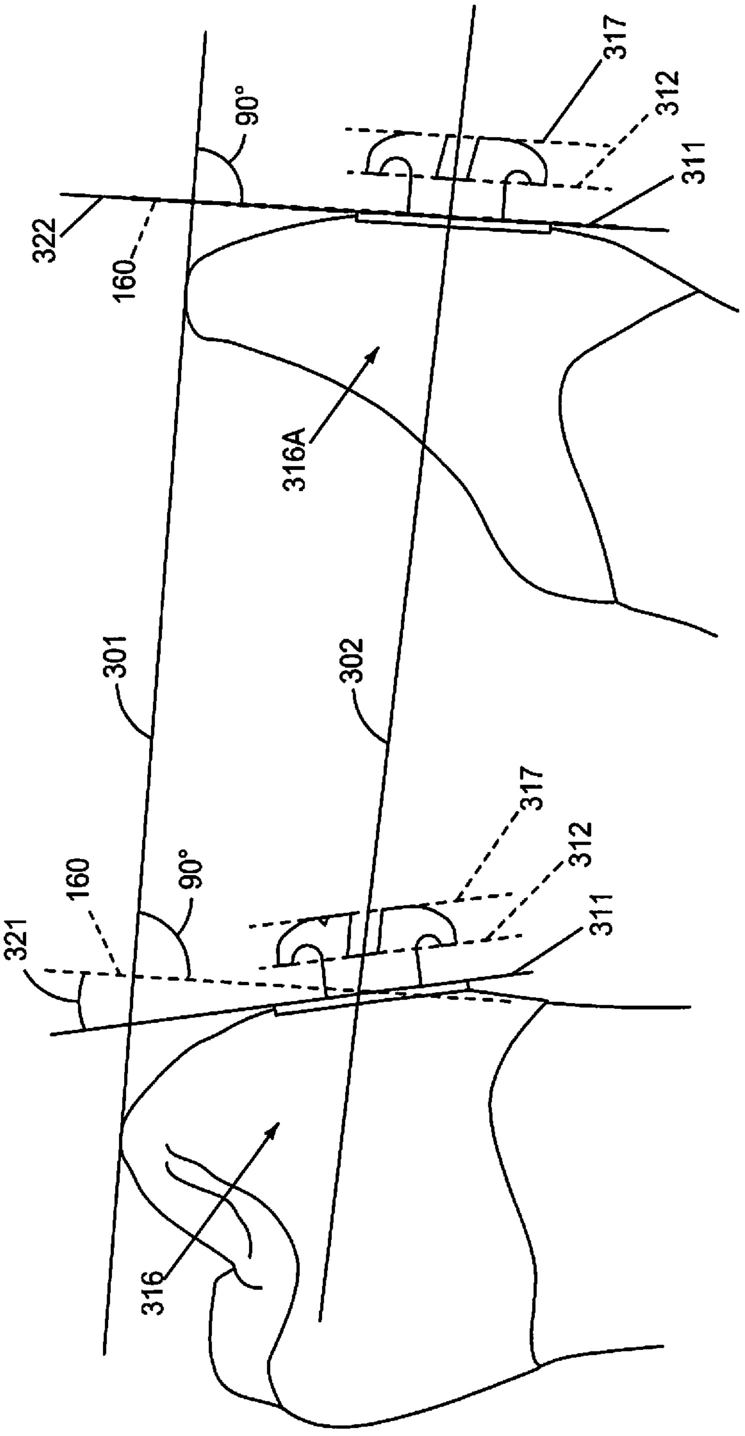
FIG. 1D PRIOR ART
FIG. 1C PRIOR ART
Figure 3A:
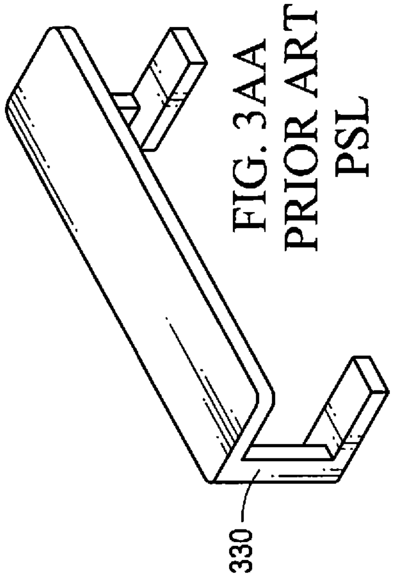
FIG. 3AA PRIOR ART
FIG. 3A is an orthographic facial surface view of a prior art Passive Self-Ligation (PSL) bracket showing the movable door in a closed position.
Figure 3A:
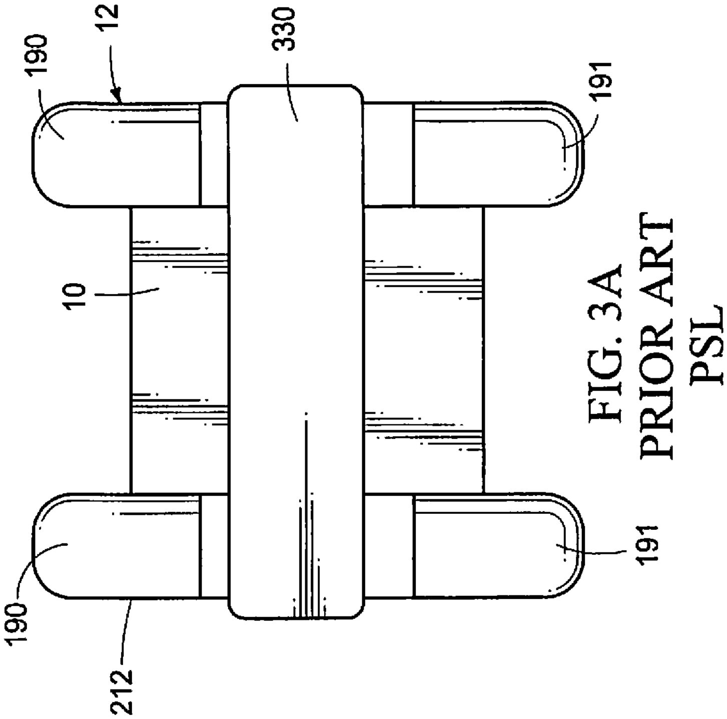
FIG. 3A PRIOR ART
Figure 3:
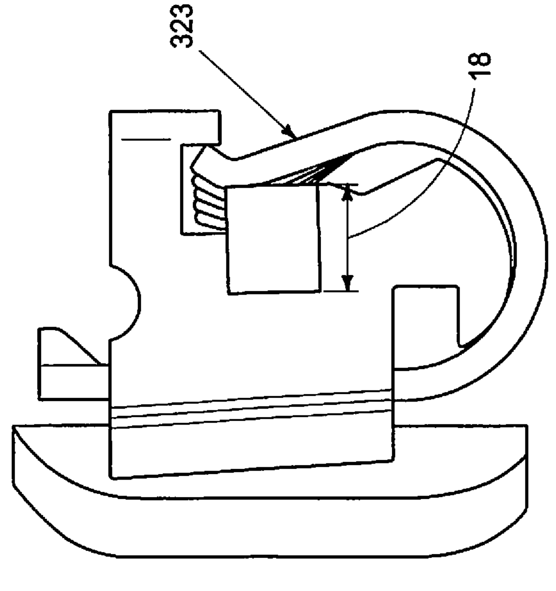
FIG. 3 PRIOR ART
FIG. 3 is an orthographic side view of a prior art Active Self-Ligation (ASL) bracket featuring an active spring clip 323 seating a prior art rectangular archwire 18 frictionally against the base wall of the archwire slot, and expressing neutral/standard torque between the bracket body and the bracket pad.

FIG. 3AA is a perspective side, superior, and lingual view of the removable door of the PSL bracket of FIG. 3A removed therefrom.

Figure 3C:
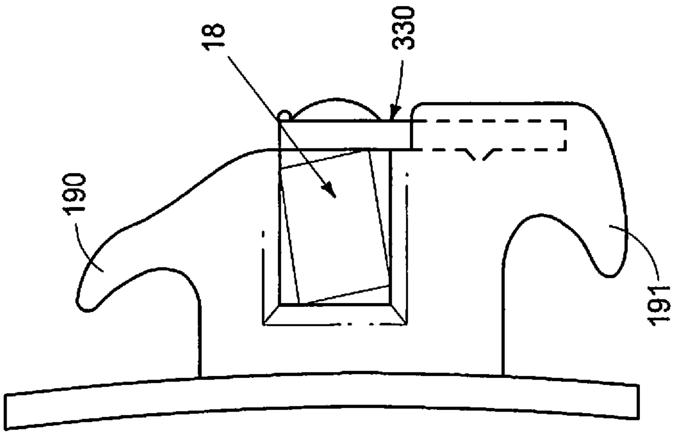
FIG. 3C PRIOR ART
Figure 3B:
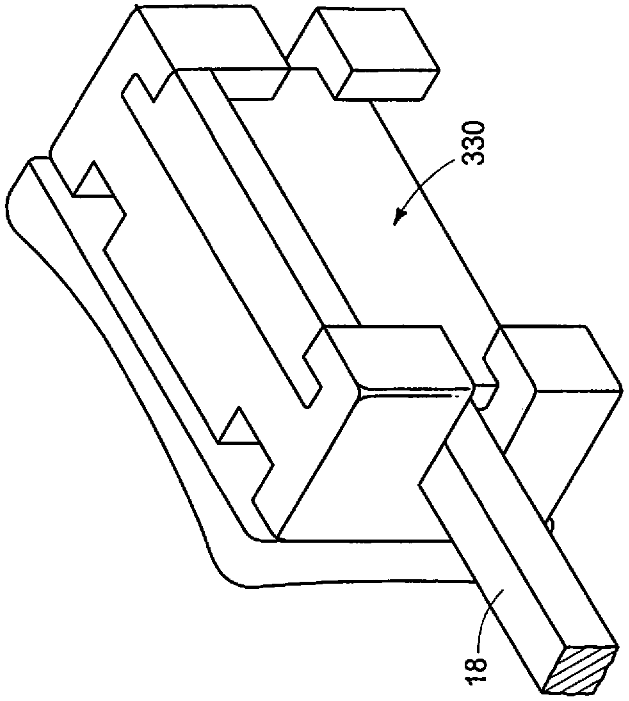
FIG. 3B PRIOR ART

FIG. 3B is a perspective side, superior, and facial view of another prior art PSL bracket, less tie wings, and featuring a door that opens superiorly that is supported from both above and below the archwire slot.

FIG. 3C is an orthographic side view of another prior art PSL bracket having upper and lower tie wings with support for the door on the inferior side of the archwire slot allowing the door to open inferiorly for easy viewing for archwire insertion and removal, and all torque in the base-pad area.

Figure 4B:
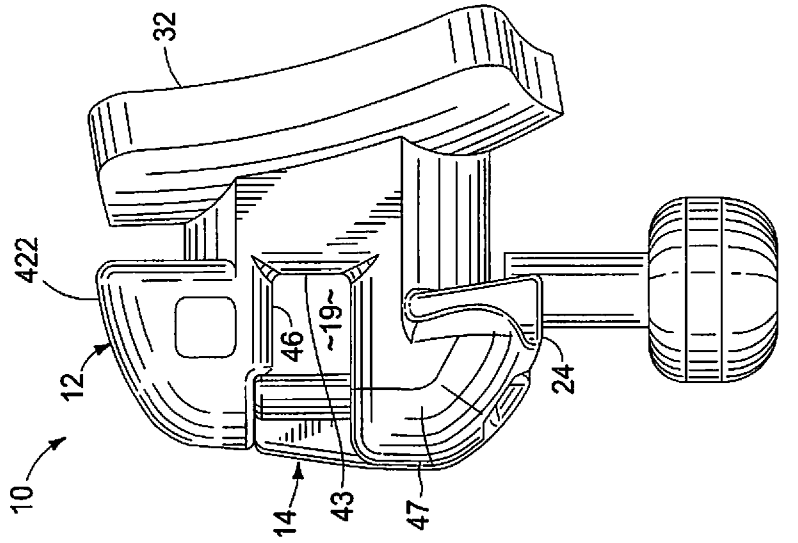
FIG. 4B PRIOR ART
Figure 4A:
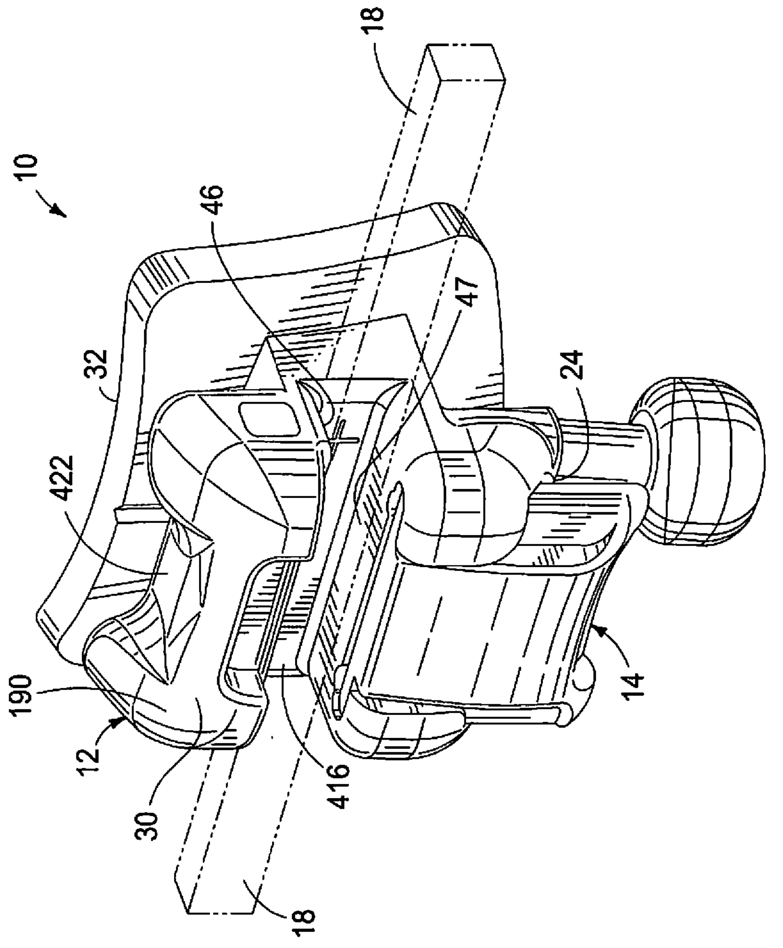
FIG. 4A PRIOR ART

FIG. 4A is a perspective facial, superior and side view of another prior art PSL bracket showing the door in an open position, showing a rectangular archwire slot with an archwire (dashed outline) therein and featuring neutral/standard torque in the archwire slot with the torque angle between the bracket body and the bracket-base pad.

FIG. 4B is an orthographic side view of the prior art PSL bracket of FIG. 4A.

Figure 5B:
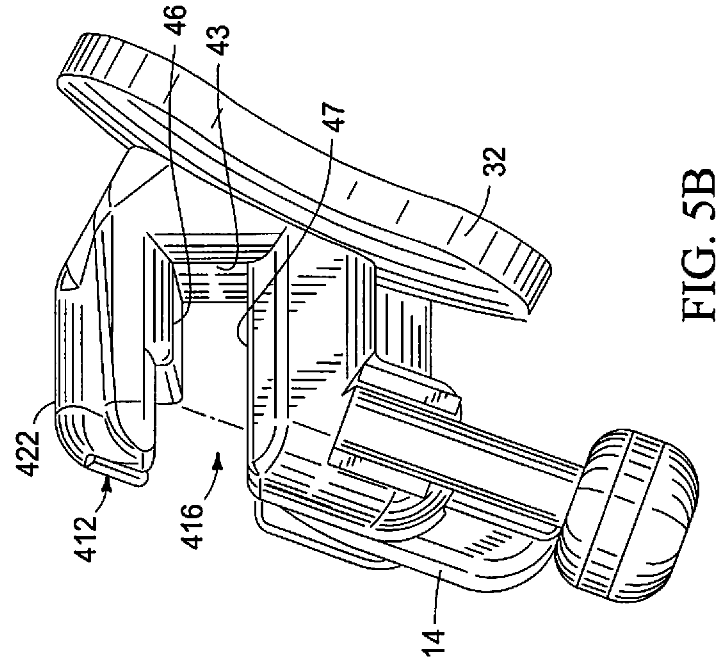
FIG. 5B PRIOR ART
Figure 5A:
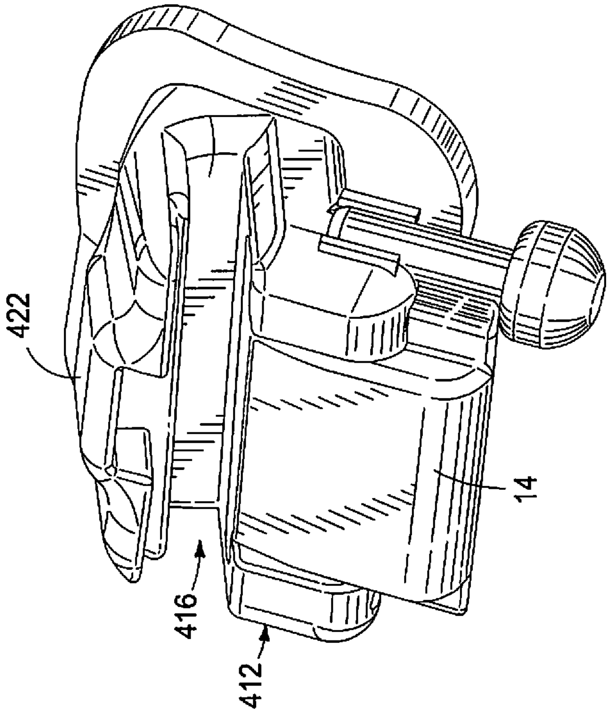
FIG. 5A PRIOR ART

FIG. 5A is a perspective facial, superior and side view of another prior art passive self-ligating (PSL) lower first molar bracket having an angularly positioned door (in an open position) and showing a neutral/standard torque archwire slot and featuring the torque angle between the bracket body base and bracket pad.

FIG. 5B is an orthographic side view of the prior art PSL bracket of FIG. 5A.

Figure 5C:
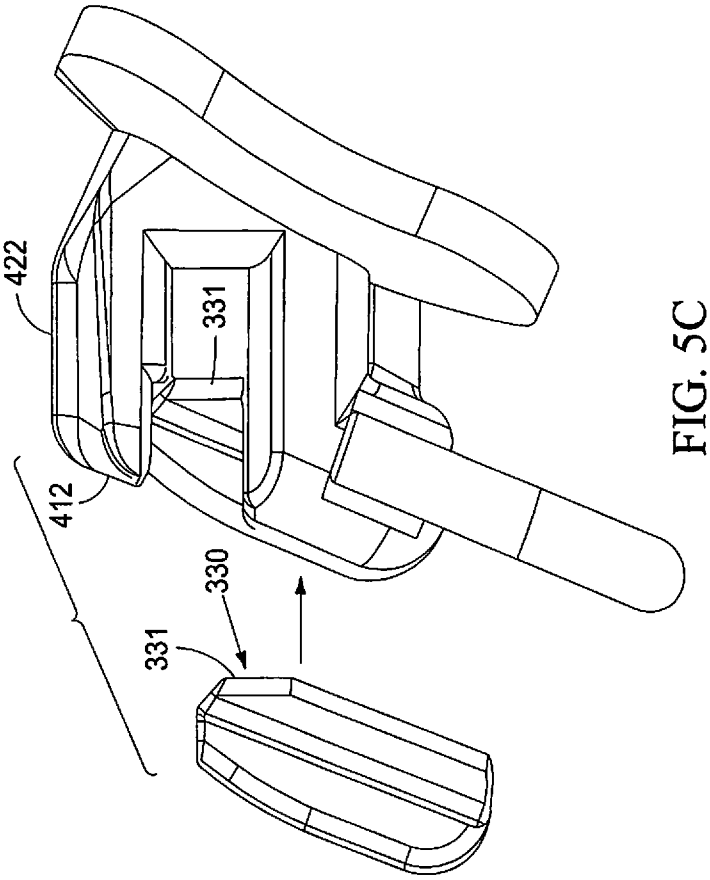
FIG. 5C PRIOR ART

FIG. 5C is an orthographic side view of the prior art PSL bracket of FIG. 5A configured for a lower first molar and showing a rectilinear archwire slot. The upper lingual side of the door is beveled to complete the fourth wall of the rectangular archwire slot.

Figure 6:
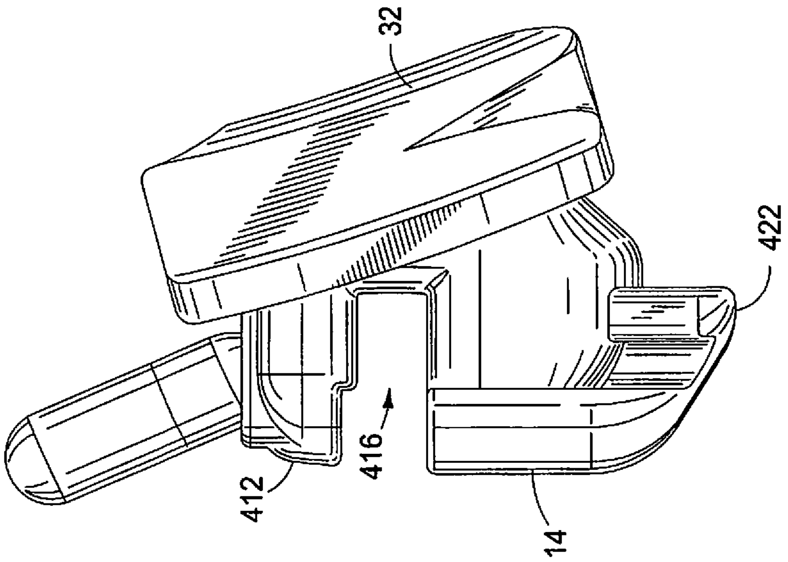
FIG. 6 PRIOR ART

FIG. 6 is an orthographic side view of another prior art PSL bracket for an upper first molar showing an open door and a superiorly placed hook with a neutral torque angle expressed between the bracket base and attached pad.

Figures 7, 8A, 8B:
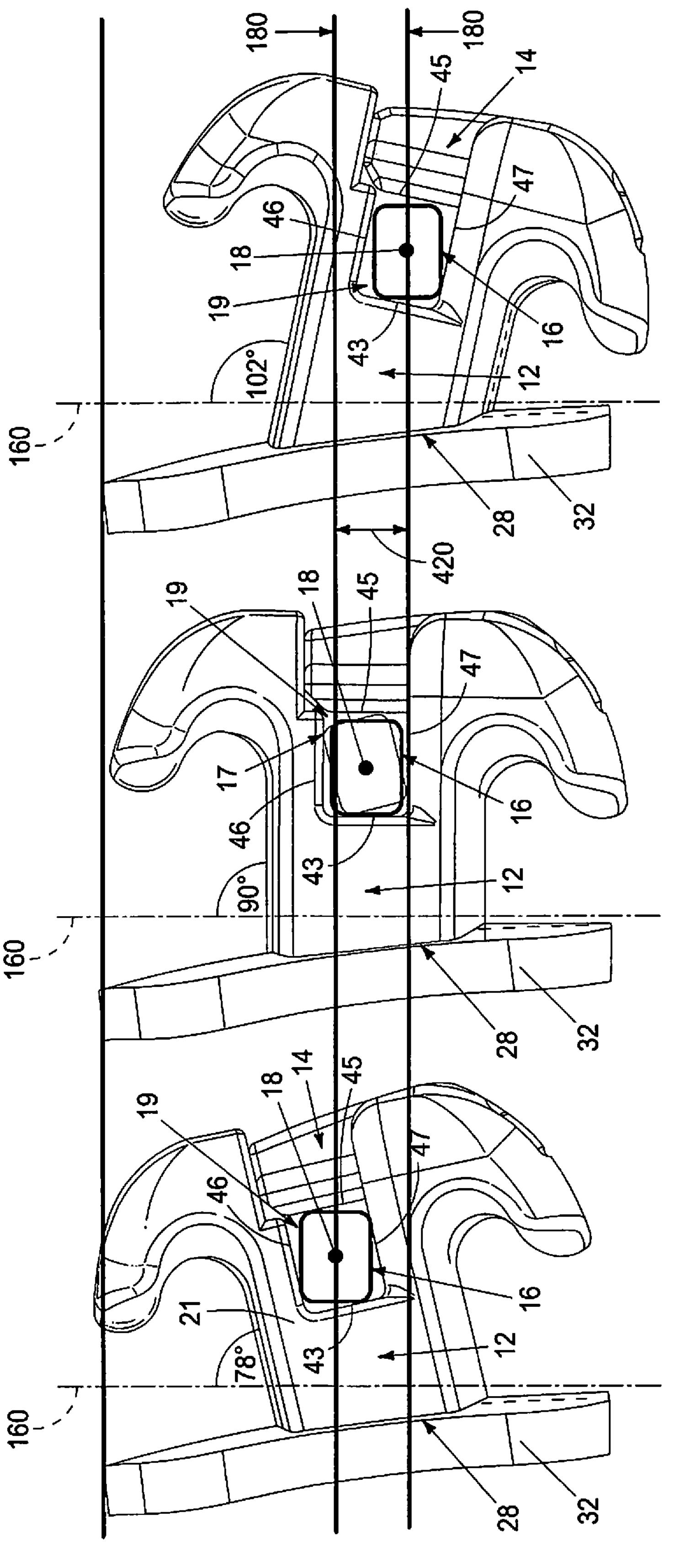
FIG. 8B PRIOR ART
FIG. 7 PRIOR ART
FIG. 8A PRIOR ART

FIG. 7 is an orthographic side view of another prior art PSL bracket for an upper central incisor with neutral torque in the base-pad area 28 and a rectangular archwire 18 in the archwire slot 19 and showing a second clinician bent archwire 17 (light outline) superimposed over the standard archwire 18 illustrating how archwires 17, 18 are bent to express third order/torque control.

FIG. 8A is an orthographic side view of a prior art PSL bracket similar to FIG. 7 with a retroclining/low torque in the base pad area and showing a horizontal prior art rectangular archwire 18 in the archwire slot, and showing how the bracket body 12 is angled at 78° relative to the vertical plane 160 and further showing how the center of horizontal archwire plane 180 moves a vertical distance 420 relative to the PSL brackets of FIGS. 7 and 8B due to the angle necessary to express torque control.

FIG. 8B is an orthographic side view of a prior art PSL bracket similar to FIG. 7 with proclining/high torque in base-pad area 28 and showing a horizontal prior art rectangular archwire 18 in the archwire slot, and showing how the bracket body 12 is angled at 102° relative to the vertical plane 160 and showing how the center of horizontal archwire plane 180 moves a vertical distance 420 relative to the PSL brackets of FIGS. 7 and 8A due to the angle necessary to express torque control, and further showing the effect torque angle has on the tie wing space.

Figure 9B:
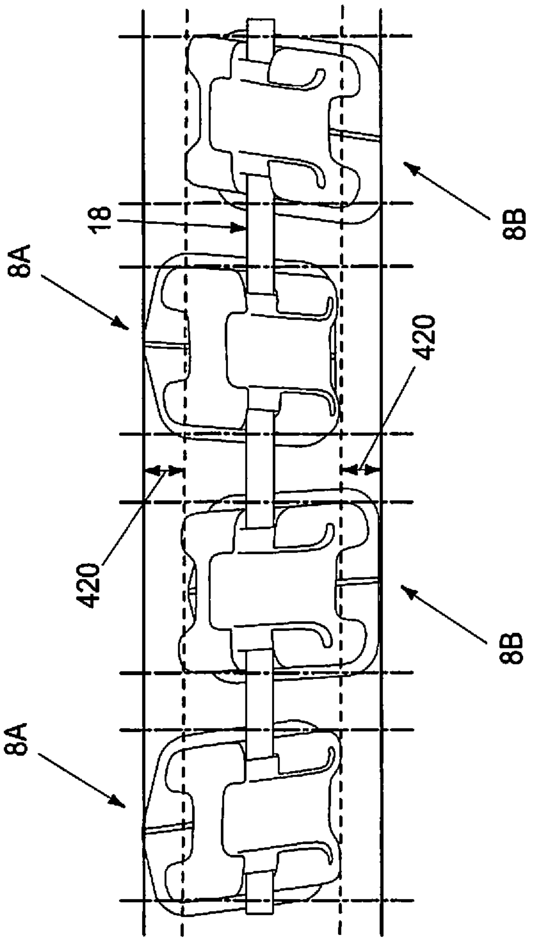
FIG. 9B PRIOR ART
Figure 9A:
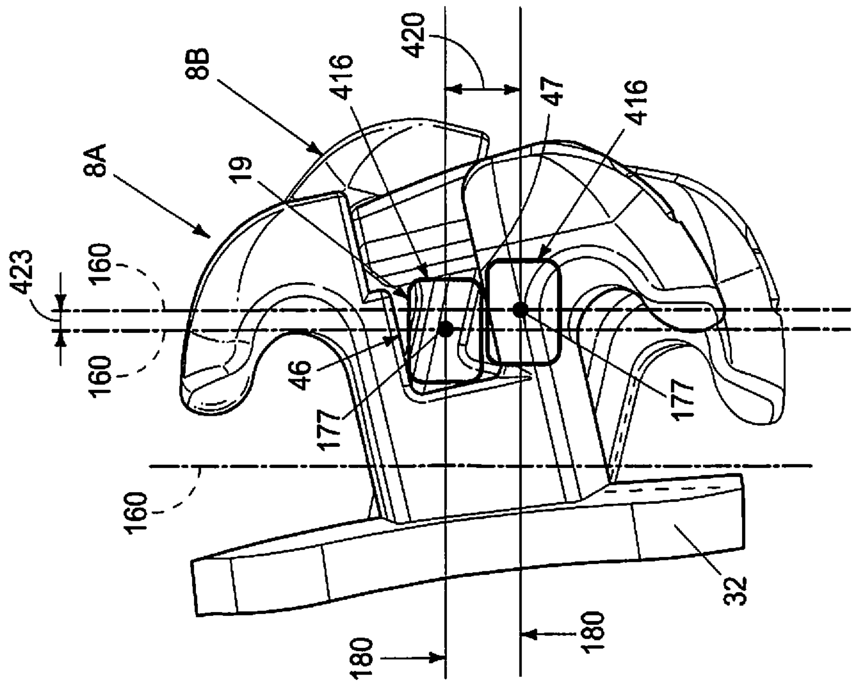
FIG. 9A PRIOR ART

FIG. 9A is an orthographic side view of the prior art PSL bracket of FIG. 8A superimposed over the prior art bracket of FIG. 8B showing one recognized drawback to known passive self-ligation brackets with high and low torque placed in the base-pad area by illustrating how the archwire center 18 moves vertically by the distance 420 as shown by the two parallel horizontal lines 180 through centers of the bracket slot and the archwire 177 and further showing how the center points of archwire 177 do not line up in the vertical plane 160 by a distance of 423.

FIG. 9B is a facial view of plural prior art PSL brackets bonded on adjacent teeth illustrating how alternating retroclining/low torque brackets require vertical offsetting from adjacent brackets by a distance 420 in order to engage with the archwire 18 in the respective archwire slots.

Figure 10B:
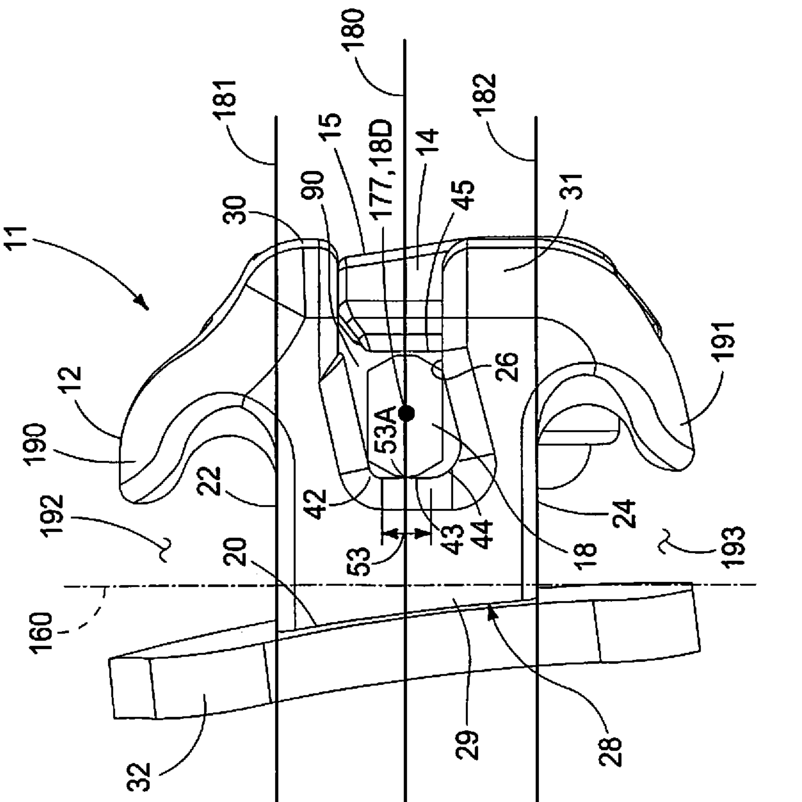
Figure 10A:
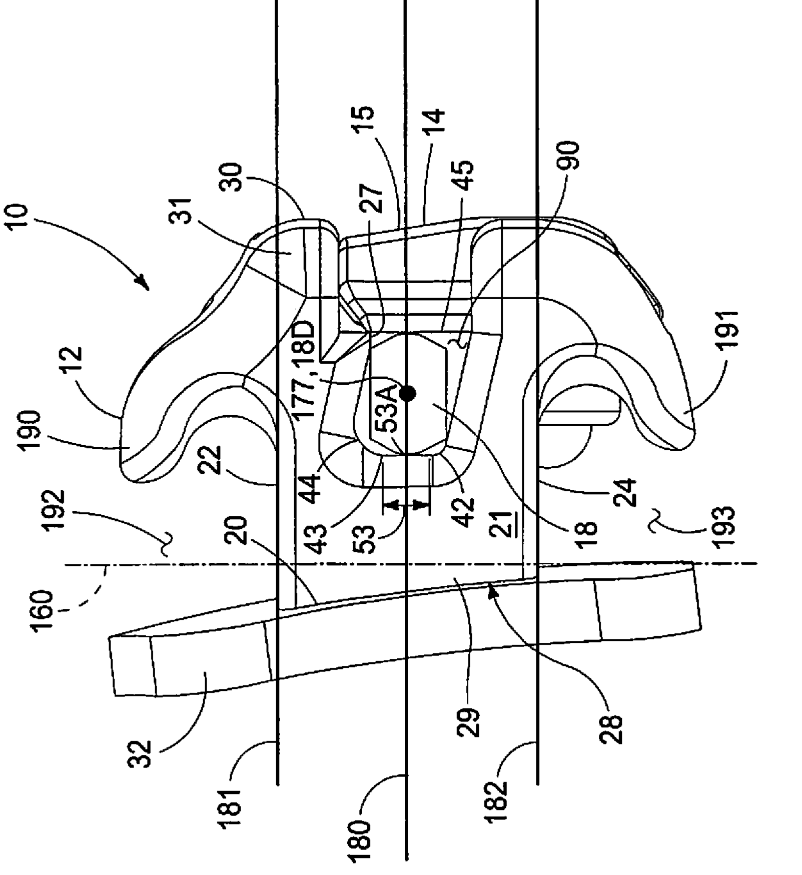

FIG. 10A is an orthographic side view of the instant passive self-ligation bracket that expresses torque from plural locations and defines an archwire slot configured for expressing high torque.

FIG. 10B is an orthographic side view of the instant passive self-ligation bracket that expresses torque from plural locations and defines an archwire slot configured for expressing low torque.

Figure 11B:
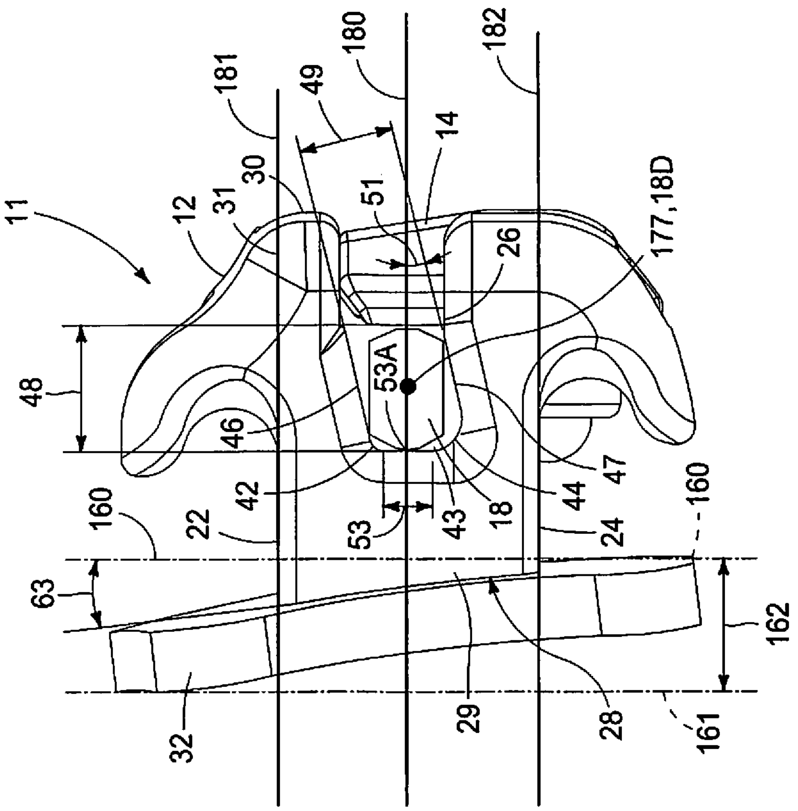
Figure 11A:
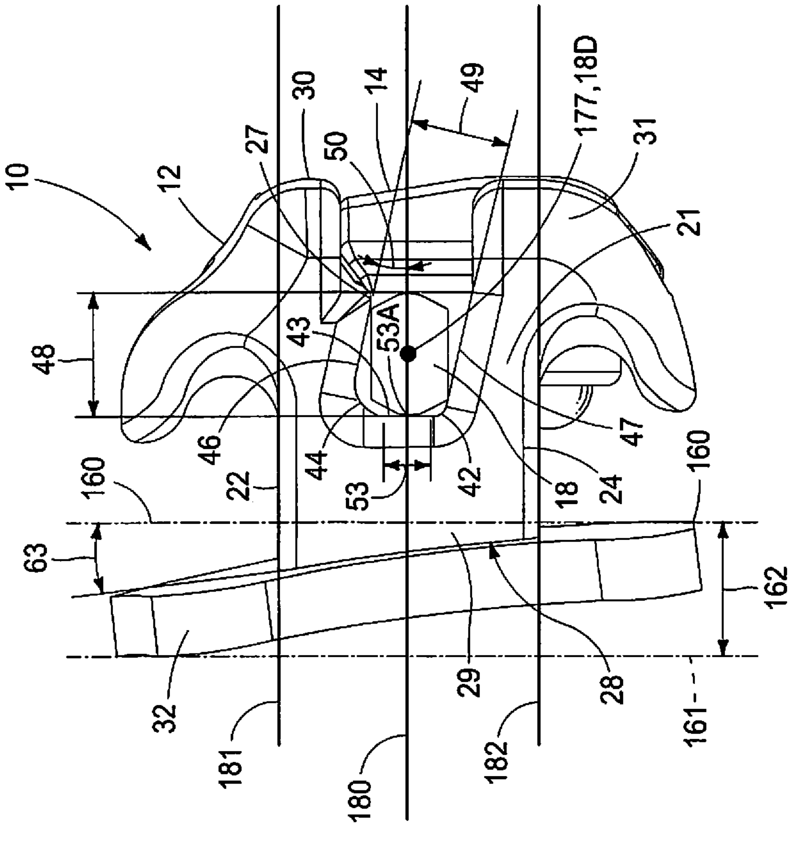

FIG. 11A is an orthographic side view, similar to that of FIG. 10A, showing further details thereof.

FIG. 11B is an orthographic side view, similar to that of FIG. 10B, showing further details thereof.

Figures 12A, 12B, 15A:
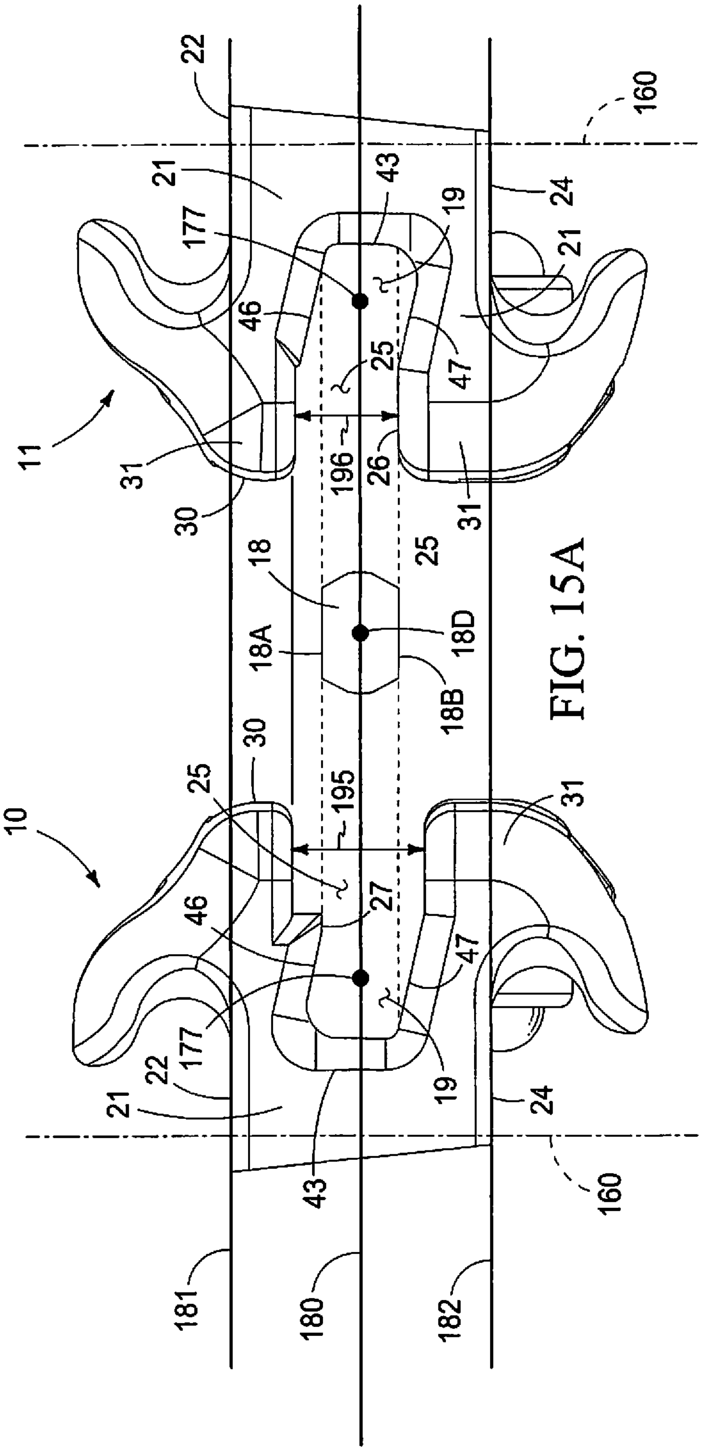

FIG. 12A is an orthographic side view of the instant passive self-ligation bracket, similar to FIG. 10A (less the movable door and pad) showing the mid-body bracket slot with upper and lower parallel slot walls featuring the desired hi torque angle and showing the enlarged gateway 25 and gateway wall 27, and showing the center of the archwire slot.

FIG. 12B is an orthographic side view of the instant passive self-ligation bracket, similar to FIG. 12A, showing the mid body bracket slot with upper and lower parallel walls featuring the desired low torque angle showing the gateway and the gateway wall 26, and showing how high torque brackets (FIG. 12A) and low torque brackets (FIG. 12B) provide a center level slot lineup with an archwire 18.

Figures 13A, 13B, 13C, 13D, 13E, 13F:
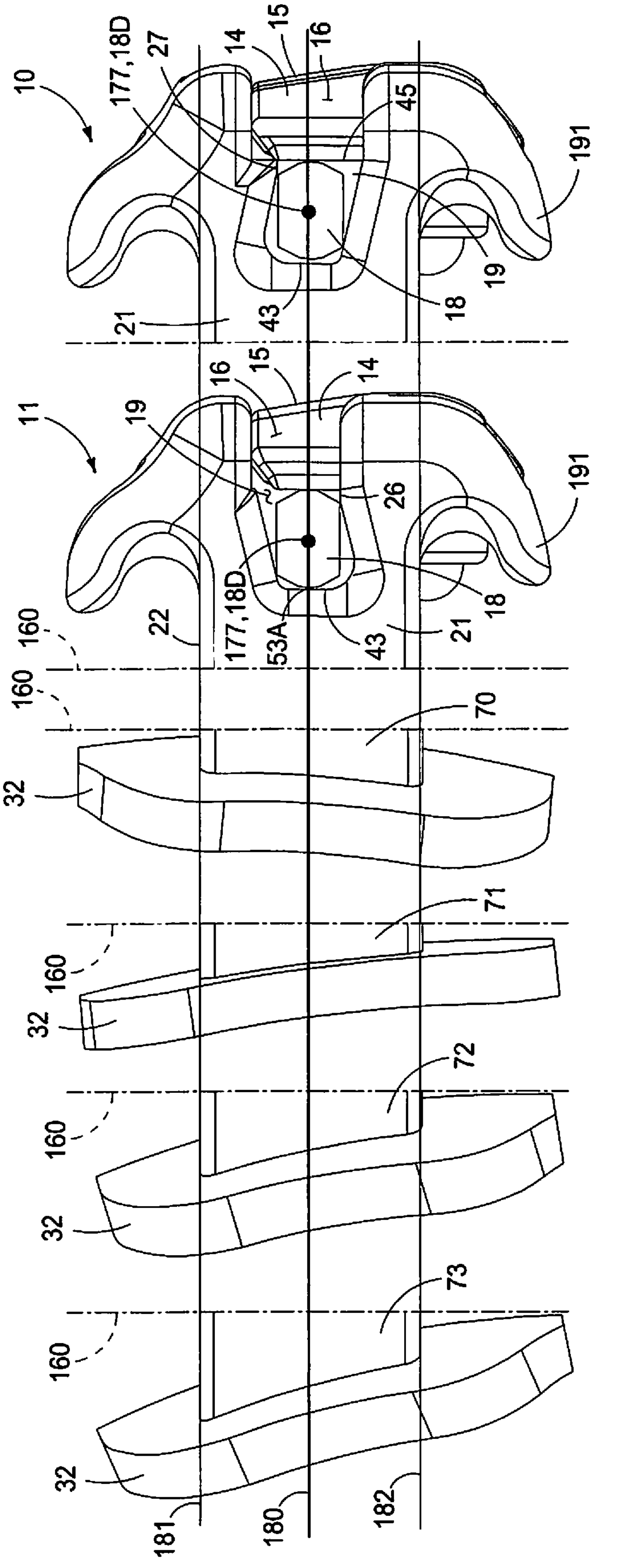

FIG. 13A is an orthographic side view of the instant high torque passive self-ligation bracket, similar to FIG. 11A showing an archwire in the archwire slot and the movable door in a closed position forming the archwire tube, and showing the slot center aligned with the longitudinal center of the archwire.

FIG. 13B is an orthographic side view of the instant low torque passive self-ligation bracket, similar to FIG. 11B showing an archwire in the archwire slot and the movable door in a closed position forming the archwire tube defining a center, and showing the bracket alignment with the high torque bracket of FIG. 13A.

FIG. 13C is an orthographic partial side view of a bracket body base and pad that provides neutral/standard torque for upper left and right first and second bicuspids while maintaining bracket alignment to create ideal tooth position without bending the archwire.

FIG. 13D is an orthographic partial side view, similar to that of FIG. 13C showing a bracket body base and pad that provides neutral/standard torque angle for upper left and right central incisors while maintaining bracket alignment to create ideal tooth position without bending the archwire.

FIG. 13E is an orthographic partial side view similar to FIGS. 13C and 13D showing a bracket body base and pad of that provides neutral/standard torque angle for lower left and right first bicuspids while maintaining bracket alignment to create ideal tooth position without bending the archwire.

FIG. 13F is an orthographic partial side view similar to that of FIGS. 13C, 13D and 13E showing a bracket body base and pad that provides neutral/standard torque angle for lower left and right second bicuspids, while maintaining bracket alignment to create ideal tooth position without bending the archwire.

Figures 14A, 14B, 15A, 15B, 15C, 15D, 15E:
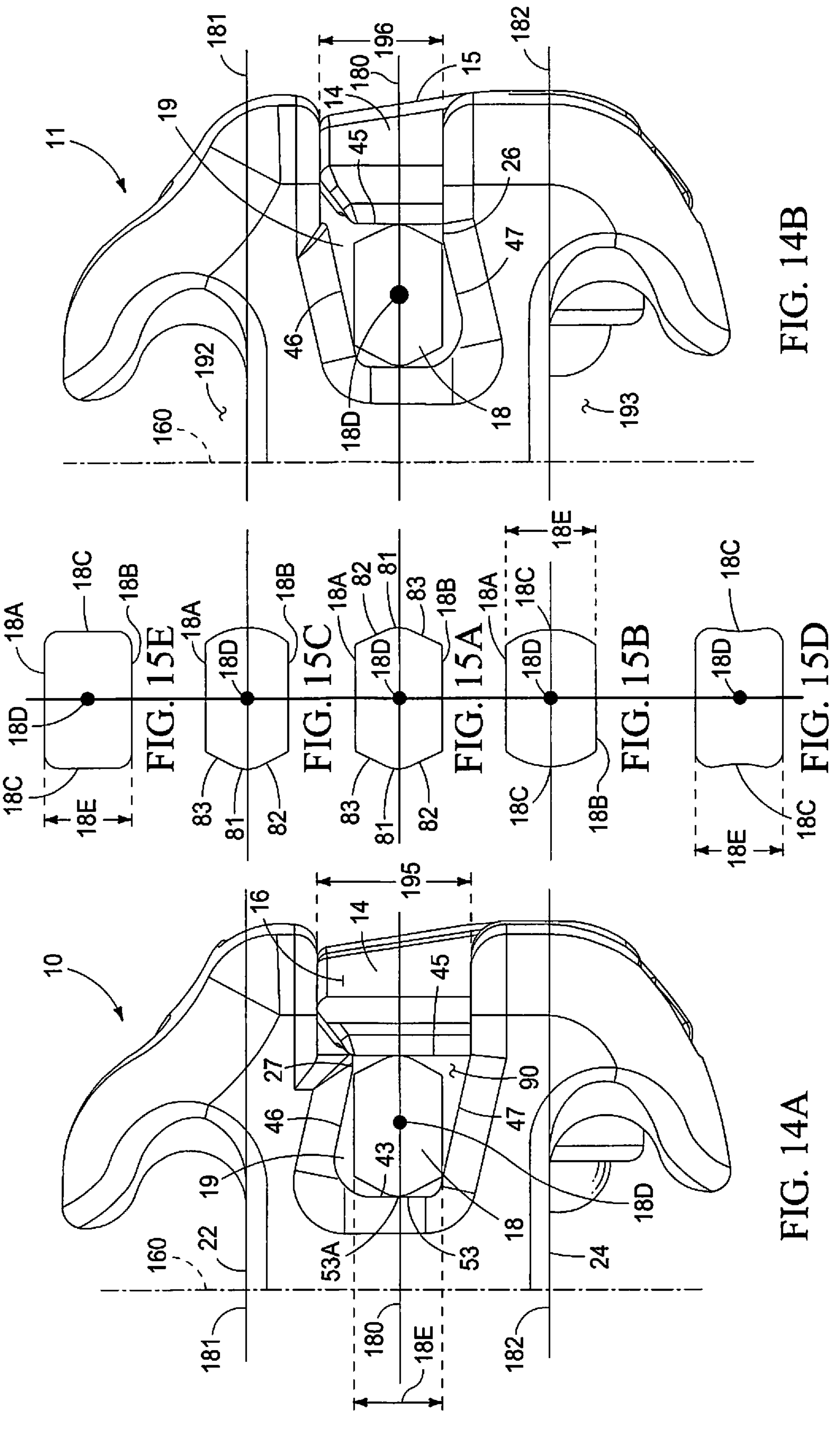

FIG. 14A is an enlarged orthographic side view of the instant passive self-ligation bracket expressing a high torque couple, showing the archwire tube, the gateway and the gateway wall, and highlighting center level slot lineup with FIGS. 14B and 15A.

FIG. 14B is an enlarged orthographic side view of the instant passive self-ligation bracket, similar to that of FIG. 14A, showing a low torque couple bracket and showing the archwire tube, the gateway, the gateway wall, and highlighting center level slot lineup 180 with FIGS. 14A and 15A.

FIG. 15A is a cross-sectional view of a first embodiment of an archwire for use with the instant passive self-ligation bracket assembly to exert predetermined torque, while providing only a single point contacts with the interior surfaces/walls of the archwire tube to minimize binding and friction therebetween, while providing first order, second order and third order tooth control.

FIG. 15B is a cross-sectional view of a second embodiment of an archwire for use with the instant passive self-ligation bracket assembly.

FIG. 15C is a cross-sectional view of a third embodiment of an archwire for use with the instant passive self-ligation bracket assembly.

FIG. 15D is a cross-sectional view of a fourth embodiment of an archwire for use with the instant passive self-ligation bracket assembly.

FIG. 15E is a cross-sectional view of a fifth embodiment of an archwire for use with the instant passive self-ligation bracket assembly.

Figures 16A, 16B, 17A, 17B:
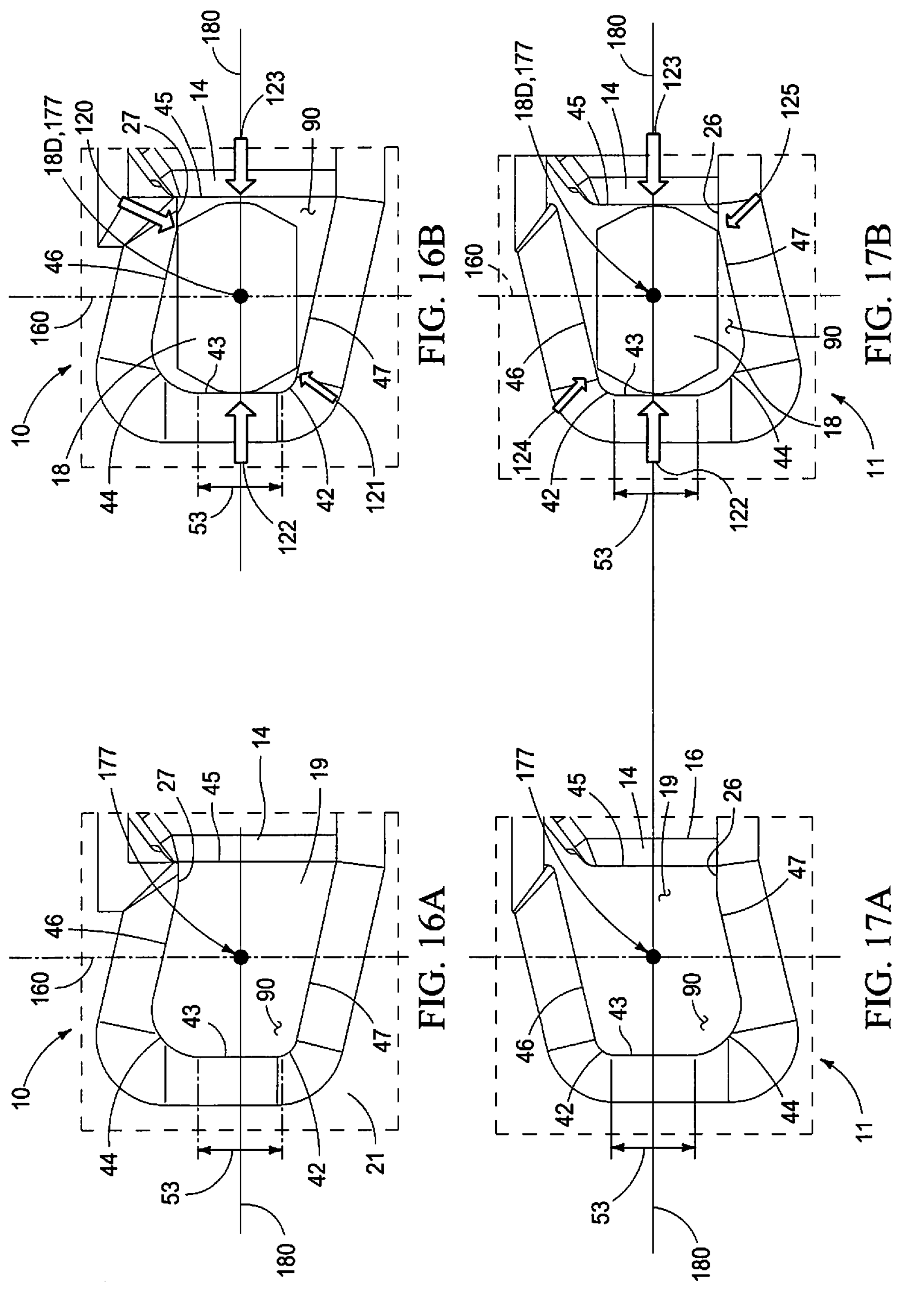

FIG. 16A is an enlarged fragmentary orthographic side view of the archwire tube for expressing a high torque couple, showing the details thereof.

FIG. 16B is an enlarged fragmentary orthographic side view of the archwire tube, similar to FIG. 16A, including an archwire in the archwire tube, and highlighting the gateway wall, the single point contacts, and center alignment.

FIG. 17A is an enlarged fragmentary orthographic front view, similar to FIG. 16A showing a low torque couple archwire tube.

FIG. 17B is an enlarged fragmentary orthographic side view, similar to FIG. 16B showing a low torque couple archwire tube with the archwire therein, the and single point contacts therebetween and the center alignment.

Figures 18A, 18B, 18C, 18D:
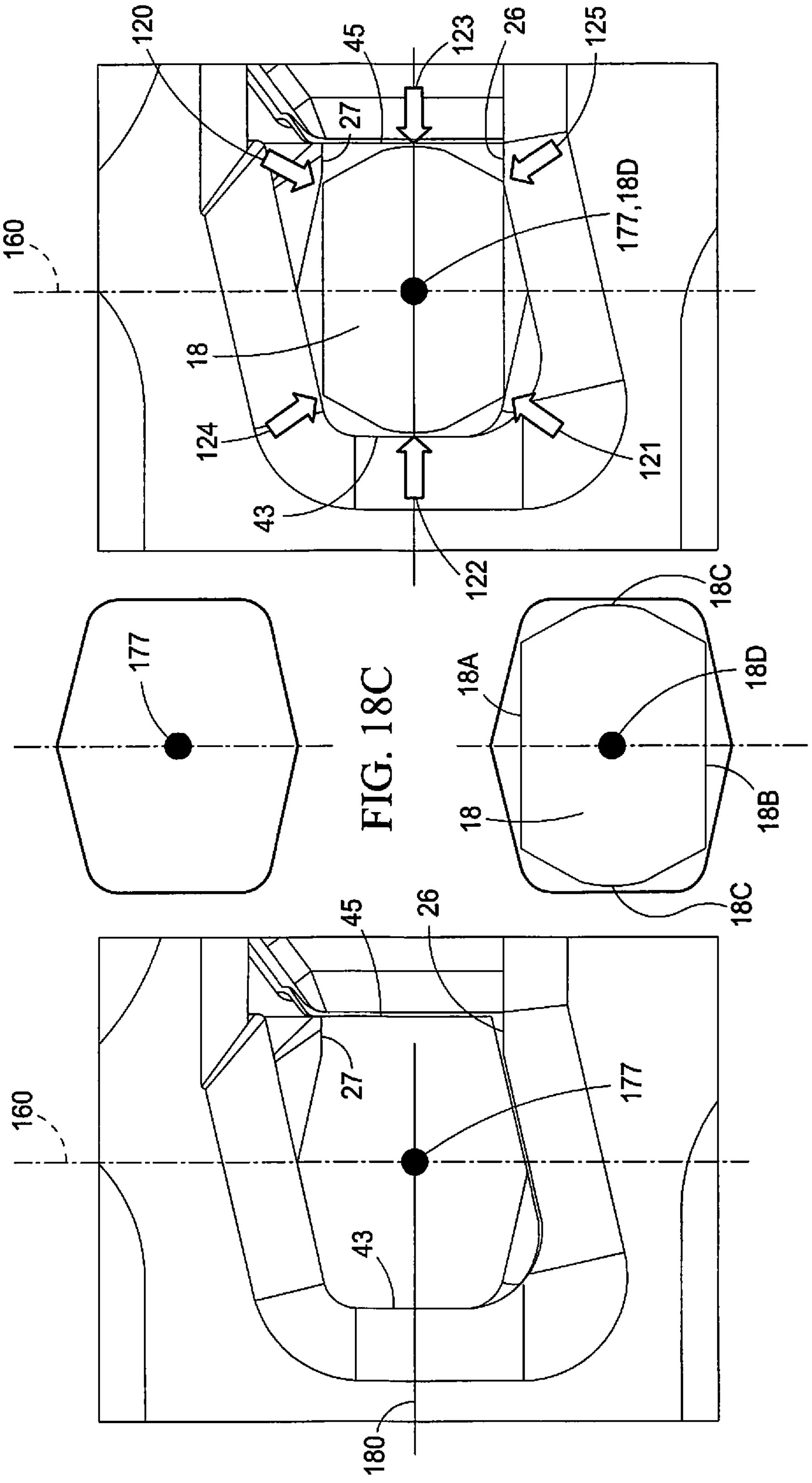

FIG. 18A is an enlarged orthographic side view of the high torque couple archwire tube of FIG. 16A superimposed over the low torque couple archwire tube of FIG. 17A showing the centers of the archwire tubes axially aligned with one another in the horizontal plane 180 and the vertical plane 160.

FIG. 18B is an enlarged orthographic side view similar to FIG. 18A showing an archwire within both aligned archwire tubes, and how the gateway and gateway wall facilitate archwire insertion and further showing the single point contacts between the archwire and the archwire tubes.

FIG. 18C is a schematic cross-section line drawing generally representing the shape of the aligned archwire tubes of the superimposed high and low torque brackets of FIG. 18A.

FIG. 18D is a schematic cross-section line drawing of the archwire tube of FIG. 18C enclosing the archwire 18 of FIG. 15A illustrating single point contacts and torque control as well as first order control and the second order control.

Figure 19A:
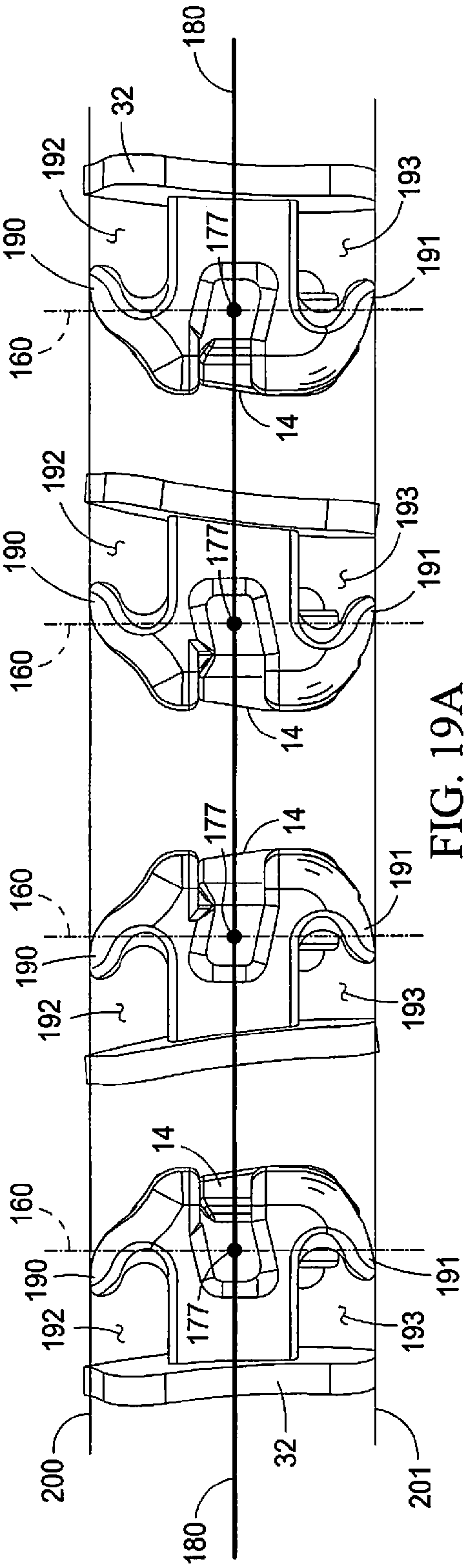

FIG. 19A is an orthographic side view of plural aligned passive self-ligation brackets of the instant invention alternating between high and low torque couples, and showing the center level slot lineup and bracket placement alignment.

Figure 19B:
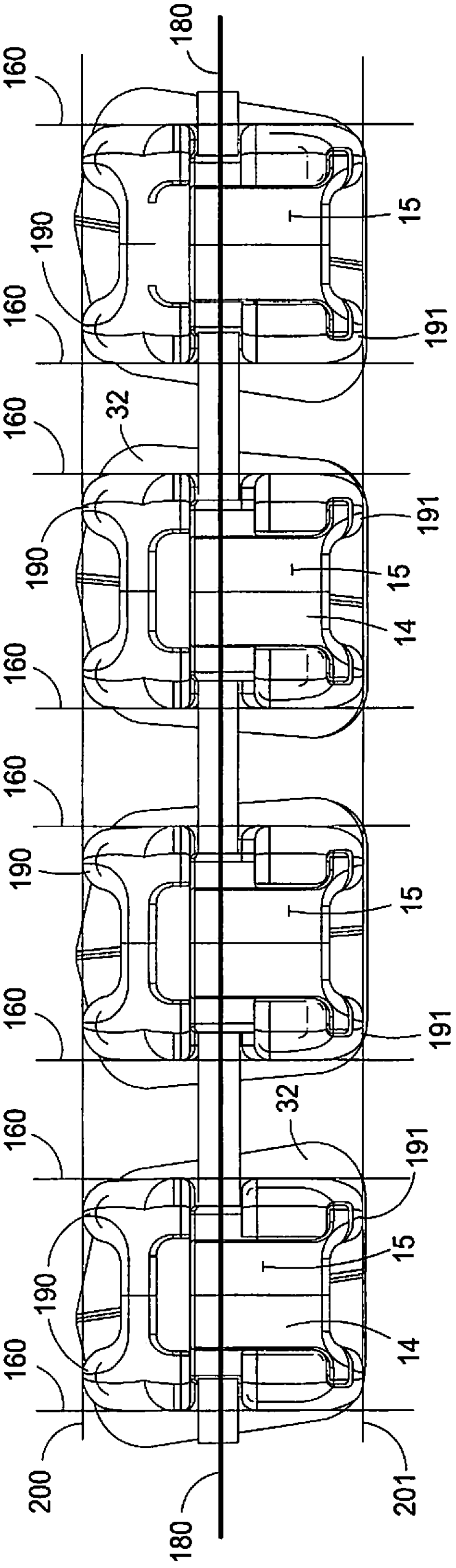

FIG. 19B is an orthographic facial view of the plural brackets of FIG. 19A with parallel horizontal lines 200, 201 and with vertical parallel lines 160 highlighting how all of the brackets are identical in size and shape and how the brackets provide novel center level slot lineup 180 from bracket to bracket.

Figure 20A:
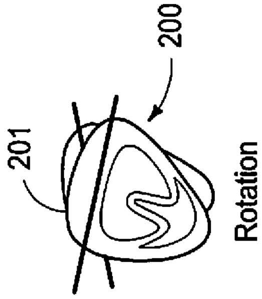

FIG. 20A is an artistic representation of a plan view of the occlusal surface of a tooth showing first example of first order tooth movement.

Figure 20B:
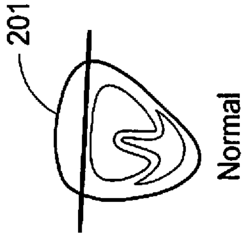

FIG. 20B is an artistic representation of a second example of first order tooth movement.

Figure 20C:
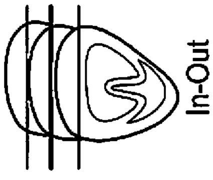

FIG. 20C is an artistic representation of a third example of first order tooth movement.

Figure 21A:
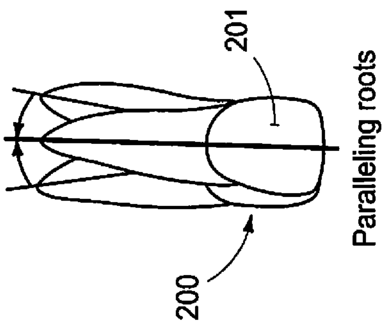

FIG. 21A is an artistic representation of a first example of second order tooth movement.

Figure 21B:
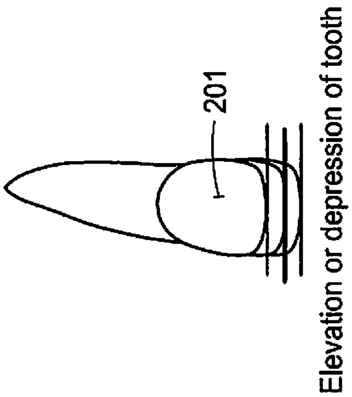

FIG. 21B is an artistic representation of a second example of second order tooth movement.

Figure 22:
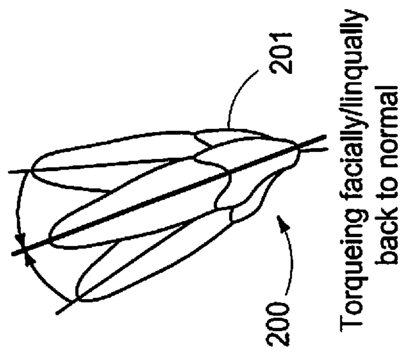

FIG. 22 is an artistic representation of third order torque tooth movement.

Figure 23:
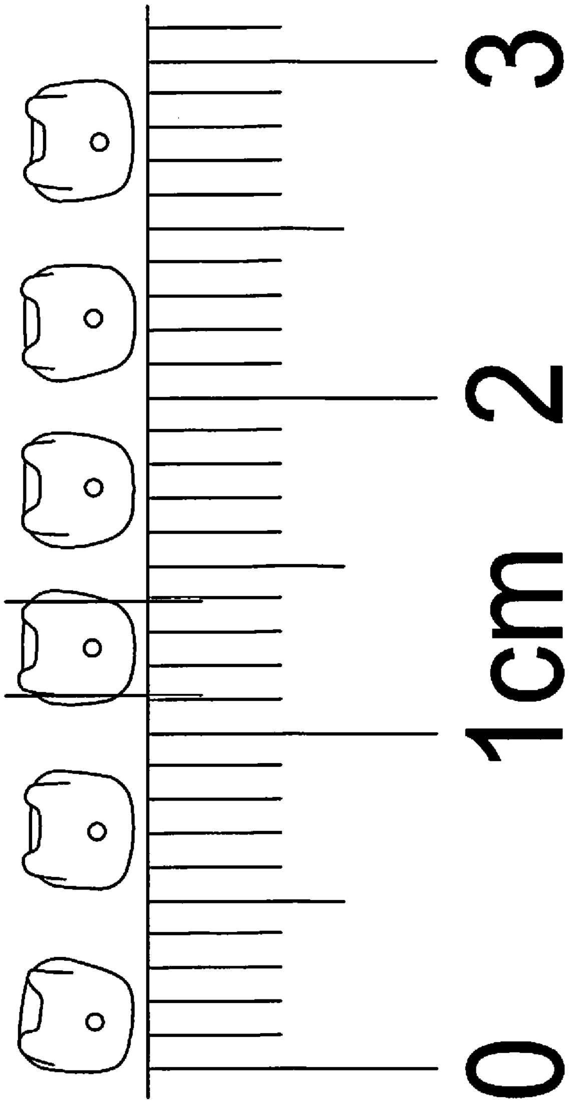

FIG. 23 is a greatly enlarged artistic representation of plural PSL brackets of the instant invention adjacent an enlarged ruler, showing the actual miniature size of the instant PSL brackets.

DETAILED DESCRIPTION OF THE PREFERRED EMBODIMENTS

This disclosure of the invention is submitted in furtherance of the Constitutional purposes of the U.S. Patent Laws "to promote the progress of science and useful arts". (Article 1, Section 8).

The various surfaces/portions of the passive self-ligation (PSL) brackets, and related components, described herein have surfaces/portion designations may change depending upon the position of PSL bracket on the tooth in the maxillary jaw or mandibular jaw. In an effort to provide clarity, the reference frame herein, shall be relative to the patient's tongue. The following terms shall have the following meanings:

Upper Dental Arch: plurality of teeth within the maxillary jaw.

Lower Dental Arch: plurality of teeth within the mandibular jaw.

Occlusal Plane: biting surfaces of the teeth.

Facial: proximate to the lips/cheeks and opposite the tongue.

Lingual: proximate to the tongue.

Superior: vertically upper surface/portion.

Inferior: vertically lower surface/portion.

First Order Movement: rotation of the tooth and/or in-out position of the tooth relative to the respective dental arch. (FIGS. 20A-20C).

Second Order Movement: paralleling the roots of the tooth and/or elevation/depression of the tooth relative to the respective dental arch. (FIGS. 21A, 21B).

Third Order Movement: torque that generates facial/lingual tipping of the tooth. (FIG. 22).

Torque: force applied to the tooth by the bracket assembly to achieve proper facial/lingual angular orientation of the tooth. (FIG. 22).

Horizontal Plane: plane represented by the X axis.

Vertical Plane: plane represented by the Y-axis.

Z axis plane: plane representing depth relative to the X-axis and the Y-axis.

Our Passive Self-Ligation (PSL) bracket assembly generally provides a passive self-ligation orthodontic bracket 10 that provides a high torque (proclining) couple, and a passive self-ligation bracket 11 that provides a low torque (retroclining) couple, each for releasable attachment to a facial surface 201 of a tooth 200, and for slidable engagement with an archwire 18 to effect treatment of malocclusions and tooth alignment and for expressing a predetermined torque to a tooth 200 from plural locations of the bracket 10, 11 without pre-bending of the archwire 18 to provide tooth control in a vertical plane (Y-axis), a horizontal plane (X-axis) and a Z-axis plane.

As shown in FIGS. 10-14, each passive self-ligation (PSL) bracket 10, 11 comprises a bracket body 12 which has a facial end portion 31, having a facial facing surface 30, an opposing lingual end portion 20, and a mid-body portion 21 between the facial end portion 31 and the lingual end portion 20. The bracket body 12 further has a superior facing surface 22 and an inferior facing surface 24, and the inferior facing surface 24 is spaced apart from, and parallel to, the superior facing surface 22. The superior 22 and inferior 24 facing surfaces are generally oriented along the horizontal (x-axis) plane represented by lines 180, 181, 182. The exterior peripheral configuration/shape of the high torque bracket 10, and the low torque bracket 11 are substantially identical for purposes, and benefits, that will be discussed herein.

Each bracket body 12 defines an archwire slot 19 that extends into the mid body portion 21 of the bracket body 12, and the archwire slot 19 has an upper wall 46 proximate the superior facing surface 22, and a lower wall 47 proximate the inferior facing surface 24. The lower wall 47 is parallel to, and spaced apart from, the upper wall 46 by predetermined distance 49. The archwire slot 19 further has a base wall 43 that communicates between the upper wall 46 and the lower wall 47 opposite the facial end portion 31 of the bracket body 12. The base wall 43 is perpendicular to the both the superior facing surface 22 and the inferior facing surface 24 of the bracket body 12 as well as perpendicular to the horizontal plane 180. Further, as shown in the Figures, the upper wall 46 and lower wall 47 are not parallel to the superior 22 and inferior facing surfaces 24, but rather are angulated/sloped relative thereto at a predetermined angle 50, 51 to provide a high torque couple 10, or a low torque couple 11, respectively. The archwire slot 19 defines an archwire slot center 177 that is in the mid body portion 21. Opposing corners 42, 44 of the base wall 43 which have predetermined radii, and are not right angles, extend between and connect, the base wall 43 to the upper and lower walls 46, 47 respectively.

The base wall 43 of the archwire slot 19 further has a mid-wall portion 53 that is linear and is parallel with the vertical plane 160. The mid-portion 53 is located between the two spaced apart corners 42, 44 of the base wall 43. One arced corner 44 communicates between a superior end of the mid-wall portion 53 and the upper wall 46, and the one arced corner 42, 44 communicates between an inferior end of the mid-wall 53 and the lower wall 47. The mid wall 53 further has a middle 53A that is vertically aligned with the center 177 of the archwire slot 19. The mid wall 53 is a linear/straight portion of the base wall 43 excluding the corners 42, 44.

Best shown in FIGS. 16 and 17, the mid wall 53 of the archwire slot 19 base wall 43 is parallel to the vertical plane 160 and parallel to the lingual facing surface 45 of the movable door 14, and at a predetermined distance 48 therefrom. Further, center 53A of the mid wall 53 is oriented along horizontal plane 180 so that the center 53A is vertically aligned with the center 177 of the archwire tube 90.

The two arced corners 42, 44 of the base wall 43 of the archwire slot 19 may have radiuses that are the same, or the radiuses may be different from one another. In one preferred embodiment of the high torque bracket 10, the arced corner 44 proximate the upper wall 46 and the mid wall 53, has a radius larger than a radius of the vertically lower adjacent corner 42. Conversely, in one preferred embodiment of the low torque bracket 11, the arced corner 44 proximate the lower wall 47 and the mid wall 53 has a larger radius. The larger radius of the arced corner 44 provides strength and structural integrity to the respective bracket 10, 11 at a recognized "weak spot", and provides additional strength when new materials, such as, but not limited to, ceramics, and/or wholly or partially translucent materials such as, but not limited to Transparent Zirconia, are used to form the bracket body 12. Further, the larger radius of corner 44 prevents/minimizes binding and friction in the event a cross-sectionally round shaped arch wire 18 is used in a treatment regime. (Cross-sectionally round archwires are known to "bind" in angled corners). It is however contemplated, that in some circumstances, the corners 42, 44 may be angled and not have a radius. As shown in the drawings, each of the interior facing surfaces 43, 46, 47, 53 of the archwire slot 19 are convexly curved in the interior direction (toward the center 177) to minimize binding and friction.

The archwire slot 19 further defines a gateway 25 (FIGS. 12A, 12B) that communicates with the facial end portion 31 at the facial facing surface 30 of the bracket body 12 to permit insertion of an unbent archwire 18 therethrough. The gateway 25 of the high torque bracket 10 has a vertical height dimension 195 that is greater than the predetermined distance 49 between the upper and lower walls 46, 47 respectively, of the archwire slot 19. Similarly, the gateway 25 of the low torque bracket 11 has a vertical height dimension 196 that is greater than the predetermined distance 49 between the upper and lower walls 46, 47 respectively of the archwire slot 19. A gateway wall 26, 27 is defined in the archwire slot 19 adjacent the gateway 25. In the hi torque bracket 10, (FIG. 12A), the gateway wall 27 is linear and is parallel to the horizontal plane 180 and communicates with both the gateway 25 and the upper wall 46 of the archwire slot 19. The gateway wall 27 eliminates a protruding angled corner that would otherwise interfere with/prevent insertion/removal of the archwire 18 into the archwire slot 19. In the low torque bracket 11 (FIG. 12B), the gateway wall 26 communicates with both the gateway 25 and the lower wall 47 of the archwire slot 19. The gateway wall 26, 27 facilitates insertion of the archwire 18 into the archwire slot 19, and more particularly eases insertion/removal of "overdrive" archwires into the archwire slot 19 without the need to bend, or otherwise deform, the archwire 18 to insert the archwire 18 into plural adjacent brackets 11, 12. This is especially important when the brackets 10, 11 may alternate between high torque 10, and low torque 11 necessitated by specific treatment regimes. (FIG. 19B). The gateway wall 26, 27 further adds an additional linear surface within the archwire slot 19 (archwire tube 20) so that the archwire slot 19/archwire tube 90 has a plurality (more than four) of flat/linear surfaces 46, 47, 26, 27, 53 which provides a uniquely shaped archwire slot 19.

A bracket base pad 32 is structurally carried at the lingual end portion 21 of the bracket body 12. The bracket base pad 32 is configured for releasable attachment to the facial surface 201 of the tooth 200. As shown in FIGS. 13C-13F, the bracket base pad 32 may have a variety of angular orientations, relative to vertical plane 160. The variety of angular orientations customizes each bracket body 12 for placement on a designated tooth 200, for instance, an incisor tooth, a canine tooth, a bicuspid, etc. in order to express a neutral/standard torque on the tooth 200. The base pad 32, at its interconnection with the bracket body 12 is one of plural locations of the bracket body 12 that expresses torque upon the tooth 200 and facilitates center level slot alignment which is one novel and important feature of the present invention. The bracket base pad 32 maintains the bracket body 12 in alignment in the horizontal plane (X-axis) 180, and in the vertical plane (Y-axis) 160 so that the bracket body 12 maintains center level slot alignment with adjacent bracket bodies 12 on adjacent teeth 200 in the respective dental arch of the patient. Also shown in FIGS. 13C-13F, each bracket base pad 32, may be laterally spaced apart from the base wall 43 of the bracket body 12 by a body extension 70, 71, 72, 73. The respective body extension 70, 71, 72, 73 for each bracket 10, 11 is determined by the clinician based upon a variety of factors, including but not limited to, the particular tooth 200, and the location of the tooth 200 in the dental arch.

A movable door 14 is carried at the facial end portion 31 of the bracket body 12 and is operable to open, and to occlude, the gateway 25. The facial facing surface 30 of the facial end portion 31 is structurally configured to operatively engage with, and movably/positionally support, the movable door 14 relative to the gateway 25. The movable door 14 has a facial facing surface 15 and an opposing lingual facing surface 45, and two opposing lateral edges 16. The movable door 14 is further slidably movable between an open position relative to the gateway 25 of the archwire slot 19 (FIGS. 12A-B), and a closed position relative to the gateway 25 of the archwire slot 19 (FIGS. 11A-B). When the moveable door 14 is in the closed position, the lingual facing surface 45 of the moveable door 14 and the archwire slot 19, in combination, define an archwire tube 90 that is defined by plural spaced apart corners 42, 44 none of which are right angles, and by more than four spaced apart flat/linear surfaces 46, 47, 26, 27, 45, 53.

The archwire tube 90 releasably encloses and slidably cooperates with the archwire 18 to apply the predetermined torque to the bracket body 12 at the slot center 177 to effect the desired first, second, and third order movements to the tooth 200. The archwire 200 is freely axially movable within the archwire tube 90 relative to the bracket body 10, 11. As shown in the Figures, the lingual facing surface 45 of the moveable door 14 is parallel to the mid wall 53 of the base wall 43 and is spaced apart from the mid wall 53 by predetermined distance 48.

As can be seen in the Figures, the upper 46 and lower 47 walls of the archwire tube 90 have a predetermined angular orientation/slope 50, 51 (FIGS. 11A, 11B) relative to the superior 22 and inferior 24 facing surfaces of the bracket body 10, 11 and relative to horizontal plane 180 so that when the archwire 18, that has no preformed torque bends therein, is engaged in the archwire tube 90, the bracket 10, 11 imparts the desired predetermined torque upon the tooth 200 to effect a resulting third order movement of the tooth 200.

A superior tie wing 190 may be carried by the bracket body 12 on the superior facing surface 22 at the facial end portion 31 and vertically above the gateway 25. Similarly, an inferior tie wing 191 may be carried by the bracket body 12 on the inferior facing surface 24 at the facial end portion 31 and vertically below the gateway 25. The superior and inferior tie wings 190, 191 facilitate placement of elastics and/or auxiliaries (not shown) and the like if necessary in the treatment regime. A superior tie wing space 192 is defined between a lingual facing surface of the superior tie wing 190 and the bracket base pad 32, and an inferior tie wing space 193 defined between a lingual facing surface of the inferior tie wing 191 and the bracket base pad 32. The superior tie wing space 192 and the inferior tie wing space 193 are substantially similar in dimension in order to ease application of the elastics and auxiliaries (not shown) and the like. Maintaining similarly dimensioned tie wing spaces 192, 193 with torque applying brackets 10, 11 is another novel aspect of the instant invention.

As shown in FIGS. 15A-15E, a preferred archwire 18 for use with the instant bracket assembly, may have a variety of cross-sectional configurations as well as a variety of thickness and width/diameter dimensions. In one preferred embodiment, the archwire 18 has a flat superior facing surface 18A, and a spaced apart and parallel flat inferior facing surface 18B, with a predetermined thickness dimension 18E therebetween. The archwire 18 further has opposing lateral surfaces 18C which may be angular/linear and/or arced and/or a combination thereof, and defines a longitudinal center 18D.

The predetermined thickness dimension 18E between the flat superior facing surface 18A and the flat inferior facing surface 18B of the archwire 18, in combination with the angle/slope 50, 51 of the archwire tube 90, and the predetermined distance 49 between the upper and lower walls 46, 47 of the archwire tube 90, determines the direction and amount of torque expressed upon the tooth 200. Further, the amount of torque can be changed by altering one or more of the predetermined thickness dimension 18E; the angle/slope 50, 51 of the archwire slot 19; and/or the predetermined distance 49. As mentioned previously, "overdrive" arch wires 18 are available and are an additional option for a clinician to use during a treatment regime. The gateway 25 allows insertion of such "overdrive" arch wires 18 into the archwire slot 19. It is to be noted, that a variation of 0.001 inch in the thickness dimension 18E of the archwire 18 generates approximately 3° of rotation of the bracket 10, 11. Stated another way, increasing the thickness dimension 18E of the archwire 18 by 0.001 inch adds +3 degrees torque to a high torque bracket 10. Similarly, increasing the thickness dimension 18E of the archwire 18 by 0.001 inch adds −3 degrees torque to a low torque bracket 11.

Each archwire 18 also has a predetermined diameter (width dimension) between the two diametrically opposed radially curved surfaces 18C. The predetermined diameter is selected to maintain consistent first order and second order control of the teeth 200 when the archwire 18 is within the archwire tube 90 and cooperating with the respective bracket bodies 12. The predetermined thickness dimension 18E of the archwire 18 between the flat superior facing surface 18A and the flat inferior facing surface 18B controls an application of force to the respective bracket bodies 12 to direct third order control to the teeth 200.

In one preferred embodiment, the archwire 18 is formed of Copper Nickel Titanium (CuNiTi) wire. Copper Nickel Titanium (CuNiTi) is known as a relatively soft material that does not hold bends and tends toward its original configuration/shape. Materials other than CuNiTi and/or Titanium Molybdenum (TiMo) and/or Stainless Steel (SS) that are presently known, and/or discovered in the future, may likewise be used for the archwire 18. Further still, the present state of manufacturing orthodontic brackets 10 is to use Powder Injection Molding (PIM) processes. However, manufacturing process such as, but not limited to, Additive Manufacturing and/or 3D printing are also contemplated methodologies that may be used to manufacture brackets 10 and archwires 18 and such methodologies and technologies are expressly contemplated herein. Technologies and methodologies that are invented/discovered in the future may likewise be used to manufacture brackets 10 and/or archwires 18.

The archwire 18 is centered within the archwire tube 90, and the longitudinal center 18D of the archwire 18 is axially aligned with the center 177 of the archwire tube 90. Further, each of the exterior facing surfaces 18A, 18B, 18C of the archwire 18 only contact the adjacent interior surfaces 45, 46, 47, 53 of the archwire tube 90 at single points of contact 122, 123, 124, 125 to minimize friction and binding therebetween. The single point contacts 122, 123, 124, 125 minimize forces being applied to the tooth 200 to effect the desired movement required by the treatment regime, and as noted previously, use of lesser forces upon the teeth 200 has shown long-term improved health benefits.

The present invention is also a system for using plural passive self-ligation brackets 10, 11 for correcting malocclusions and tooth alignment. The system comprises a first passive self-ligation bracket 10, 11 and a second passive self-ligation bracket 10, 11. One or both of the first and second brackets 10, 11 may be a high torque bracket 10, and/or may be a low torque bracket 11. Each of the first and second passive self-ligation brackets 10, 11 has a bracket body 12 that has a facial surface 30 at a facial end portion 31, a lingual end portion 20 carrying a bracket base pad 32 configured for adherence to a facial surface 201 of a tooth 200, and a mid-portion 21 between the facial end portion 31 and the lingual end portion 20, a superior facing surface 22 that may have a superior tie wing 190, and an inferior surface 24 that may have an inferior tie wing 191, and the inferior surface 24 is spaced apart from, and parallel to, the superior facing surface 22.

Each bracket body 12 further has a movable door 14 engaged with the bracket body 12 at the facial end portion 31. The movable door 14 is slidably movable relative to the facial end portion 31 to open, and to occlude a gateway 25 communicating with the archwire tube 90 defined in the bracket body 12.

The archwire tube 90 is a means, and provides a means, for exerting a predetermined torque on the tooth 200 from the lingual end portion 31 of the bracket body 12, and from the mid-portion 21 of the bracket body 12. The means for exerting the predetermined torque defines a center 177, and the means is angulated/sloped 50, 51 relative to the superior and inferior surfaces 22, 24 respectively, of the bracket body 12, and relative to the horizontal plane 180 at a predetermined angle 50, 51 so as to express the predetermined torque.

The system further includes an archwire 18 that is slidably engaged within the means of the first passive self-ligation bracket 10 and slidably engaged within the means of the second passive self-ligation bracket 11 for exerting the predetermined torque. The archwire 18 has no torque bends prior to engagement with the means, and the archwire 18 physically contacts each respective means at plural spaced apart single point contacts to exert the predetermined torque.

The means may express a high torque couple upon the tooth 200, or the means may exert a low torque couple upon the tooth 200, or the means may exert a neutral/standard torque on the tooth 200.

The cross-sectional shape and dimensional size of the archwire 18, and the angular orientation 50, 51 and dimensional size 48, 49 of the means defined in the bracket body 12 provide the first, second and third order tooth control. The means and the archwire 18 are both manufactured to tolerances of approximately 0.0001 inch. Such precise manufacturing has only recently become available in the orthodontic practice, and was not possible only a few years ago. FIG. 23, in combination with FIGS. 10A and 10B show the miniaturized size, and the details of the bracket bodies 12, the movable door 14, and the archwire 18, and the components thereof. It is to be understood that without such precise manufacturing tolerances, and precision, the instant invention will not provide the benefits intended within the short treatment times with use of the present invention. "Slop" or "play" of even approximately 0.05 inch can/will negate the benefits of this invention. Precision and accuracy is critically important.

The benefits of the present invention are provided by a combination of the thickness dimension 18E of the archwire 18, in combination with the dimensions 48, 49 of the archwire tube 90, and angular orientation/slope 50, 51 of the archwire tube 90, and not by torque bends in the archwire 18.

As shown in the Figures, the outer peripheral configuration of the low torque bracket 11 is substantially identical to the outer peripheral configuration of the high torque bracket 10 (except for the angulation/slope 50, 51 of the archwire slot 19). The base wall 43, and mid wall 53, remain parallel to vertical plane 160 and parallel to the lingual facing surface 45 of the movable door 14.

The brackets 10, 11 provide total tooth control with the combined torque outputs from two locations. Standard/neutral torque is applied to the tooth 200 from the bracket base pad area 32. (Torque in base). High, or low, or standard torque is applied to the tooth 200 from the archwire tube 90 in combination with the archwire 18 carried therein. The impact of combining the torque values from these two locations with an archwire 18, for the first time achieves first order, and second order and third order control of the tooth 200 without bending torque bends into the archwire 18.

Equally contemplated herein as part of the disclosed invention, is a third bracket body 12 with a neutral torque archwire slot 19, that also expresses neutral/standard torque in base-pad area 32. The neutral torque bracket body 12 has an outer peripheral configuration that is substantially identical to the outer peripheral configuration of the high and low torque bracket bodies 10 and 11. The neutral torque bracket (not shown) may be utilized in treatment regimens where a clinician desires to only place a neutral or standard torque bracket upon a given tooth 200 that is already in its proper third order position and only needs first and second order tooth positioning.

FIGS. 12A and 12B show bracket bodies 10, 11 facing one another with the high torque 10 and low torque 11 bracket bodies 12 in the correct horizontal plane 180, 181, and 182 and perpendicular with the vertical plane 160. The movable doors 14 have been removed to show that both unique shaped high and low torque archwire slots 19 are positioned near the mid-body 21 of the body 12, between the facial end portion 31 and the lingual end portion 20. It should be understood however, that due to the length dimension of the body extensions 70, 71, 72, 73 that may be necessary for each bracket body 12 to be configured for a particular tooth 200, the mid body 21 may not be in the precise "middle" of the bracket body 12. But rather, the mid body 21 is at a position between the opposing end portions 20, 31.

FIG. 12A shows how the archwire 18 (including an "overdrive" archwire 18) fits into the archwire slot 19 without needing to be bent downwardly. (dashed lines). The lower wall 47 (FIG. 12B) similarly has a gateway wall 26 that is parallel with the horizontal plane 180 and that forms part of the gateway 25. The gateway wall 26, 27 is an important feature that facilitates insertion/removal of the archwire 18 into/from the archwire slots 19 of plural brackets 10, 11 placed on adjacent teeth, particularly when one bracket 10 expresses high torque 10, and an adjacent bracket 11 expresses low torque 11. In such a situation, it is challenging to the clinician (and painful to the patient) to insert or remove larger dimension archwire 18 if increased torque is needed on either or both adjacent teeth 200. FIGS. 12A and 12B further highlight how the present invention provides center level slot lineup 180 passing through slot centers 177 and facilitates easy clinical usage of the wider insertion gateways 25 for larger dimension archwires 18 and also facilitating easy bracket placement, alignment and re-bonding.

FIGS. 13A and 13B show a side view of brackets 10 and 11 (without pads) with an archwire 18 inserted in each archwire tube 90 with center level slot lineup 180 passing through centers 177. Lines 181 and 182 represent the outline of the bracket bodies and are aligned in the horizontal plane 180 and perpendicular to the vertical plane 160.

FIGS. 15A-15E disclose some (but not all) of the archwires 18 that may be utilized with the instant bracket-archwire assembly. Some archwire 18 configurations are preferred more than others, due to the cross-sectional shape and performance characteristics. The object of each archwire design is to achieve single point contacts with the upper 46 and lower 47 walls of the archwire tube 90, and also single point contacts with the mid wall 53 and the lingual facing surface 45 of the movable door 14 to minimize binding and friction. Manufacturing these archwire shapes/configurations with very accurate tolerances (e.g. 1.001 inch) is challenging and costly, and was not previously achievable at an economical cost with previously known/available manufacturing techniques. The archwires 18 shown have similar flat superior 18A and flat inferior 18B surfaces that are parallel to one another to generate the intended torque in combination with the shape and angulation/slope of the upper 46 and lower 47 walls of the archwire tube 90. The opposing lateral surfaces 18C of the various archwires 18, vary from design to design.

FIG. 15A is an archwire 18 with flat parallel superior and inferior surfaces 18A, 18B, and with a very short mid-curved/arced surfaces 81 on the opposing lateral surfaces 18C and having two parallel flat surfaces 82 in one plane, and two additional parallel flat surfaces 83 in a second plane.

FIG. 15B is an archwire having the opposing lateral surfaces 18C both of which are radially arced relative to a shared center 18D.

FIG. 15C is an archwire having opposing lateral surfaces 18C each with a different shape and contour. As shown, one lateral outside surface 18C is a radial arc and the other lateral surface 18C has a mid-short curved surface 81 and two linear/flat surfaces 82 and 83.

FIG. 15D is a generally rectangular archwire 18 with two convex mid-curved surfaces 85 on the opposing lateral surfaces 18C.

FIG. 15E is a rectangular archwire 86 with four rounded corners, and is known to cause increased friction/binding with brackets 10, 11.

FIG. 16A is an enlarged side view of the archwire slot 19 and graphically shows that the archwire tube 90 is defined by more than four linear surfaces 53, 46, 47, 45, and 27, and by more than four corners, none of which are right angles. The mid-wall 53 of the base wall 43 remains parallel to the vertical line 160. The mid-wall 53 can vary in length by modifying the corner 42, 44 radii, but in the preferred embodiment has one larger arced corner 44 for strength. The larger arced corner 44 also keeps the flat mid portion 53 of the base wall 43 equally oriented to center line horizontal plane 180.

In FIG. 16B, arrows 120 and 121 (FIG. 16B) point to the hi torque point contacts between upper wall 46 and lower wall 47 and the archwire 18, while arrows 122 and 123 point to the "in-out"/"rotation" control between archwire 18 single contact points with base wall 43 and the lingual facing surface 45 of the movable door 14.

FIG. 17A is an enlarged side view, similar to FIG. 16A, but showing a low torque 11 archwire slot 19/archwire tube 90.

In FIG. 17B, arrows 124 and 125 point to the low torque single point contacts between the upper and lower walls 46 and 47 and archwire 18, while arrows 122 and 123 point to the "in-out"/"rotation" control between archwire 18 point contacts with base wall 43 and lingual facing surface 45 of the movable door 14.

FIGS. 18A and 18B are enlarged side views of superimposed archwire tubes 90 from high torque bracket 10, and low torque bracket 11, and archwire 18 therein to graphically show the center level slot lineup. (Centers 177, 178 are in the same position horizontally and vertically). Both drawings are oriented to the horizontal plane 180 and to perpendicular vertical plane 160. FIG. 18C represents the periphery of the aligned and overlaid archwire tubes 90 of FIGS. 18A and 18B. When inserting one of the archwires 18 shown in FIGS. 15A, 15B, and 15C into outline shown in FIG. 18D, it is apparent how the archwire 18 fits into the archwire tube 90 from bracket 10, 11 to bracket 10, 11 entirely around the upper and lower dental arches. FIG. 18B is a more detailed view of FIG. 18A, showing the archwire tube 90 overlays with arrows 121, 122, 123, 124 pointing to the single point contacts that reduce friction and binding, and ideally produce rotation control and, in-out control 122 and 123, while angulation, vertical, and torque control 120, 121, 124, and 125 on each and every tooth 200 throughout the upper and lower dental arches without bending the archwire 18.

FIGS. 19A and 19B show an aligned side view, and facial view of four upper left and right central and lateral incisors with alternating high 10 and low 11 torque archwire slots 19 aligned in the horizontal plane 180 with center level slot lineup and also aligned along the vertical plane 160. The present invention, for the first time, accomplishes first order, second order and third order tooth control with all brackets 10, 11 having identical external profiles in both the upper and lower dental arches while remaining parallel in both the vertical 160 and horizontal 180 planes. This provides a major positive impact for clinicians by dramatically improving treatment outcomes and simplifying bracket placement and re-bonding procedures.

As can be seen in the Figures, the center 177 of the archwire tube 90 is located at a generally medial position of the mid-body portion 21 of the bracket body 12, and the torque force applied to the bracket body 12 by the archwire 18 within the archwire tube 90 is axially centered at the center 177 of the archwire tube 90.

The archwire tube 90 has a predetermined height dimension 49 between the upper wall 46 and the lower wall 47, and the archwire 18 has a predetermined thickness dimension 18E between the superior facing surface 18A and the inferior facing surface 18B. The predetermined thickness dimension 18E of the archwire 18 imparts a torque force to the bracket body 12 at the mid-body 21 of the bracket body 12 to direct third order control to the respective tooth 200, while two diametrically opposed lateral surfaces 18C of the archwire 18 maintain first and second order control of the respective tooth 200.

The art and science of this invention will provide, and will have, a profound positive impact on the quality of patient care and at the same time simplifying clinical mechanics while dramatically decreasing treatment times.

OPERATION

It is believed the structure of our invention is readily apparent from the detailed description provided above. The operation of the invention is briefly described herein.

A plurality of passive self-ligation orthodontic brackets 10, 11 is used to treat malocclusions and tooth alignment, and for expressing first, second and third order torque control to teeth 200 to control tooth 200 movement in the horizontal plane 180 (X-axis), the vertical plane 160 (Y-axis) and the Z-axis plane without placing torque bends in the archwire 18.

A first and a second passive self-ligation orthodontic bracket 10, 11 are provided. Each of the first passive self-ligation orthodontic bracket 10, 11 and the second passive self-ligation orthodontic bracket 10, 11 having a bracket body 12, each bracket body 12 having a facial end portion 31 having a facial facing surface 30, a lingual end portion 20, a mid-body portion 21 between the facial end portion 31 and the lingual end portion 20, a superior facing surface 22 and an inferior facing surface 24 that is parallel to the superior facing surface 22. Each bracket body 12 further defines an archwire slot 19 that extends into the mid body portion 21 of the bracket body 12, and the archwire slot 19 has an upper wall 46 proximate the superior facing surface 22, and a lower wall 47 proximate the inferior facing surface 24, and the lower wall 47 is parallel to the upper wall 46, and spaced apart from the upper wall 46 by a predetermined height dimension 49. A base wall 43 that has a linear mid wall 53 portion, communicates between the upper wall 46 and the lower wall 47 opposite the facial surface 30 of the bracket body 12. The mid wall 53 of the base wall 43 is perpendicular to the both the superior facing surface 22 and the inferior facing surface 24 of the bracket body 12 and is angular relative to the upper wall 46 and the lower wall 47 and relative to the horizontal plane 180. The archwire slot 19 further defines a center 177, and defines a gateway 25 that communicates with the facial surface 30 of the bracket body 12. The archwire slot 19 is sized to receive the archwire 18 therein.

The first and second bracket bodies 12 each have a bracket base pad 32 structurally carried at the lingual end portion 20 of the bracket body 12. The bracket base pad 32 configured for releasable attachment to the facial surface 201 of a first tooth 200 and to a second tooth 200, and each bracket base pad 32 is oriented, relative to the respective bracket body 12, and relative to the vertical plane 160 that is perpendicular to the superior and inferior surfaces 22, 24 at a predetermined angle 63 to express a predetermined torque force on the respective first tooth 200 and second tooth 200.

Each bracket body 12 may have a superior tie wing 190 carried by the bracket body 12 on the superior facing surface 22 adjacent the facial surface 30 and vertically above the gateway 25 to the archwire slot 19, and each bracket body may have an inferior tie wing 191 carried by the bracket body 12 on the inferior facing surface 24 adjacent the facial surface 30 and vertically below the gateway 25 to the archwire slot 19.

The facial end portion 31 of each bracket body 12 is configured to slidably carry a movable door 14. The movable door 14 has a facial surface 15 and an opposing lingual facing surface 45, and two opposing lateral edges 16, and the movable door 14 is slidably movable between an open position relative to the gateway 25 of the archwire slot 19, and a closed position relative to the gateway 25 of the archwire slot 19. When the moveable door 14 is in the closed position relative to the gateway 25 of the archwire slot 19, the lingual facing surface 45 of the moveable door 14 and the archwire slot 19 define an archwire tube 90 having a cross-sectional shape that is defined by more than four linear surfaces, and by plural spaced apart corners 42, 44 none of which are right angles. The archwire tube 90 encloses and cooperates with the archwire 18 to apply predetermined forces to the first bracket body 12 and to the second bracket body 12 to effect first, second, and third order movements to the first tooth 200 and to the second tooth 200, and the archwire 18 is axially movable within each archwire tube 90 relative to the first bracket body 12 and relative to the second bracket body 12, and the lingual facing surface 45 of the moveable door 14 of each bracket body 12 is parallel to the mid wall 53 of the archwire tube 90.

The archwire tube 90 of each bracket body 12 has a predetermined angular orientation/slope 50, 51 relative to the superior 22 and inferior 24 facing surfaces of the respective bracket body 12 and relative to the horizontal plane 180 to direct a predetermined torque to the tooth 200 so as to effect a resulting movement of the tooth 200.

The first passive self-ligation orthodontic bracket 10, 11 is affixed to the facial surface 201 of a first tooth 200 by the clinician.

The clinician thereafter vertically aligns and affixes a second passive self-ligation orthodontic bracket 10, 11 to the facial surface 201 of a second tooth 200 so that the second passive self-ligation orthodontic bracket 10, 11 is vertically aligned with the first passive self-ligation bracket 10, 11 affixed to the first tooth 200.

An archwire 18 is provided. The archwire 18 has no intentionally formed torque bends therein and has a substantially uniform cross-sectional shape. The substantially uniform cross-sectional shape has a generally planar/flat superior surface 18A, a generally planar/flat inferior surface 18B that is parallel to and spaced apart from the generally planar/flat superior surface 18A by a predetermined thickness dimension 18E, and the archwire 18 has two diametrically opposed lateral surfaces 18C that may be, or may not be, arced, with a predetermined diameter dimension therebetween, and the archwire 18 has a first original configuration that represents a dental arch of a patient.

The clinician places the archwire 18 within the archwire slot 19 of the first bracket body 12 and places the archwire 18 within the archwire slot 19 of the second bracket body 12, and places the archwire 18 in the archwire slot 19 of each and every other bracket body 12 along the dental arch. Thereafter, the clinician moves the movable door 14 of the first passive self-ligation orthodontic bracket 10, 11 to a closed position, and moves the movable door 14 of the second passive self-ligation orthodontic bracket 10, 11 to the closed position, (and thereafter doing the same for each bracket 12 along the dental arch) so that the archwire 18 is retained in the archwire tubes 90 but is also axially slidably movable within the archwire tubes 90 defined by the bracket bodies 12 so as to effect the treatment of the malocclusion and to effect tooth alignment.

The process of installing bracket bodies 12 on the teeth 200 of the second to dental arch, and inserting an archwire 18 in the archwire slots 19 thereof is repeated. Thereafter, and if determined appropriate by a clinician to continue the treatment regime, a second archwire 1 is provided. The second archwire 18 has a thickness dimension 18E and a diameter dimension that is different from the first archwire 18. The clinician removes the first archwire 18 from the archwire tubes 90 of the brackets 10, 11 and inserts the second archwire 18 into the archwire slots 19 of the respective bracket bodies 12 and then closes the movable doors 14 thereon to secure the second archwire 18 in the respective archwire tubes 90 to continue the desired treatment regime to completion.

The description of the embodiments, and operation, of the invention is intended to cover all alternatives, modification, and equivalent arrangements as may be included within the spirit and scope of the invention as defined by the claims. In particular, those skilled in the art will recognize that the components of the embodiments of the invention described herein can be arranged in a multiple of different ways.

Having describe the structure and operation of our Passive Self-Ligation Bracket Assembly and its use in treating malocclusions and tooth alignment, we request issuance of Utility Letters Patent.

The invention claimed is:

1. A passive self-ligation bracket system for correcting malocclusions and tooth alignment relative to one or more of a vertical plane (Y-axis), a horizontal plane (X-axis), and a Z-axis plane with an archwire during orthodontic treatment, the system comprising:

A) a first passive self-ligation bracket comprising:

1) a first bracket body formed of zirconia and including a first base pad that is configured for attachment to a first tooth and a first body extension extending from the first base pad and being configured to position the first base pad in a first non-parallel orientation relative to the vertical plane, the first bracket body defining a first archwire slot comprising:

(i) a base wall parallel to the vertical plane, (ii) an upper wall spaced apart from and parallel to a lower wall, each of the upper wall and the lower wall extending away from the base wall and being configured to be sloped relative to the horizontal plane, (iii) a gateway wall configured to be parallel to the horizontal plane and intersecting one of the upper wall and the lower wall, (iv) a first corner defined by a first arc intersecting each of the base wall and the upper wall, the first arc having a first radius, and (v) a second corner defined by a second arc intersecting each of the base wall and the lower wall, the second arc having a second radius different from the first radius; and 2) a first movable door having a lingual facing surface and being slidably engaged with the first bracket body between an opened position and a closed position relative to the first archwire slot, and in the closed position, the lingual facing surface faces the base wall, wherein the lingual facing surface and each of the base wall, the upper wall, the lower wall, and the gateway wall form a first archwire tube for interacting with the archwire during orthodontic treatment and establishing a first center of the first archwire tube;

B) a second passive self-ligation bracket different from the first passive self-ligating bracket comprising:

1) a second bracket body and formed of zirconia and including a second base pad that is configured for attachment to a second tooth and a second body extension extending from the second base pad and being configured to position the second base pad in a non-parallel orientation relative to the vertical plane, the second bracket body defining a second archwire slot comprising:

(i) a base wall parallel to the vertical plane, (ii) an upper wall spaced apart from and parallel to a lower wall, each of the upper wall and the lower wall extending away from the base wall and being configured to be sloped relative to the horizontal plane, (iii) a gateway wall configured to be parallel to the horizontal plane and intersecting one of the upper wall and the lower wall, (iv) a first corner defined by a first arc intersecting each of the base wall and the upper wall, the first arc having a first radius, and (v) a second corner defined by a second arc intersecting each of the base wall and the lower wall, the second arc having a second radius different from the first radius; and 2) a second movable door having a lingual facing surface and being slidably engaged with the second bracket body between an opened position and a closed position relative to the second archwire slot, and in the closed position, the lingual facing surface faces the base wall, wherein the lingual facing surface and each of the base wall, the upper wall, the lower wall, and the gateway wall form a second archwire tube for interacting with the archwire during orthodontic treatment and establishing a second center of the second archwire tube, wherein the first non-parallel orientation is different than the second non-parallel orientation, and wherein during use, the first center aligns with the second center to provide horizontal and vertical center level slot lineup, and C) an unbent archwire for slidable engagement within the first archwire tube and for slidable engagement within the second archwire tube for exerting the high torque couple or the low torque couple.

2. The passive self-ligation bracket system of claim 1, wherein the first passive self-ligation bracket exerts a high torque couple.

3. The passive self-ligation bracket system of claim 2, wherein the second passive self-ligation bracket exerts low torque couple.

4. The passive self-ligation bracket system of claim 1 wherein when the first passive self-ligation bracket is bonded to the first tooth and the second passive self-ligation bracket is bonded to the second tooth, the archwire has no torque bends prior to engagement with the first archwire slot of the first passive self-ligation bracket, and the archwire physically contacts each of the base wall, the upper wall, and the lower wall of the first archwire slot of the first passive self-ligation bracket at single point contacts.

5. A passive self-ligation bracket for moving a tooth relative to one or more of a vertical plane (Y-axis), a horizontal plane (X-axis), and a Z-axis plane with an archwire during orthodontic treatment, the passive self-ligation bracket comprising:

a bracket body formed of zirconia and including a base pad that is configured for attachment to a tooth and a body extension extending from the base pad and being configured to position the base pad in a non-parallel orientation relative to the vertical plane, the bracket body defining an archwire slot comprising:

(i) a base wall parallel to the vertical plane, (ii) an upper wall spaced apart from and parallel to a lower wall, each of the upper wall and the lower wall extending away from the base wall and being configured to be sloped relative to the horizontal plane, (iii) a gateway wall configured to be parallel to the horizontal plane and intersecting one of the upper wall or the lower wall, (iv) a first corner defined by a first arc intersecting each of the base wall and the upper wall, the first arc having a first radius, and (v) a second corner defined by a second arc intersecting each of the base wall and the lower wall, the second arc having a second radius different from the first radius; and a movable door having a lingual facing surface and being slidably engaged with the bracket body between an opened position and a closed position relative to the archwire slot, and in the closed position, the lingual facing surface faces the base wall and the lingual facing surface and each of the base wall, the upper wall, the lower wall, and the gateway wall forming an archwire tube for interacting with the archwire during orthodontic treatment.

6. The passive self-ligation bracket of claim 5, wherein the first radius is greater than the second radius and the gateway wall intersects the upper wall.

7. The passive self-ligation bracket of claim 5, wherein the second radius is greater than the first radius and the gateway wall intersects the lower wall.

* * * * *